US012741232B2

(12) United States Patent
Alabastri et al.

(10) Patent No.: US 12,741,232 B2
(45) Date of Patent: Sep. 22, 2026

(54) RESONANT THERMAL OSCILLATOR TO IMPROVE OUTPUT OF A THERMO-FLUIDIC SYSTEM

(71) Applicant: William Marsh Rice University, Houston, TX (US)

(72) Inventors: Alessandro Alabastri, Houston, TX (US); Pratiksha Dongare, Houston, TX (US); Nancy J. Halas, Houston, TX (US); Peter J. Nordlander, Houston, TX (US); Oara Neumann, Houston, TX (US)

(73) Assignee: William Marsh Rice University, Houston, TX (US)

( * ) Notice: Subject to any disclaimer, the term of this patent is extended or adjusted under 35 U.S.C. 154(b) by 325 days.

(21) Appl. No.: 17/760,070

(22) PCT Filed: Feb. 12, 2021

(86) PCT No.: PCT/US2021/017965
§ 371 (c)(1),
(2) Date: Aug. 3, 2022

(87) PCT Pub. No.: WO2021/163568
PCT Pub. Date: Aug. 19, 2021

(65) Prior Publication Data

US 2023/0067663 A1 Mar. 2, 2023

Related U.S. Application Data

(60) Provisional application No. 62/975,747, filed on Feb. 12, 2020.

(51) Int. Cl.
*B01D 61/36* (2006.01)
*B01D 1/00* (2006.01)
(Continued)

(52) U.S. Cl.
CPC ......... *B01D 1/0041* (2013.01); *B01D 1/0035* (2013.01); *B01D 1/0082* (2013.01);
(Continued)

(58) Field of Classification Search
CPC ........ C02F 1/14; C02F 1/04–18; B01D 61/36; B01D 61/364
See application file for complete search history.

(56) References Cited

U.S. PATENT DOCUMENTS 2,589,406 A * 3/1952 Latham, Jr. .......... B01D 1/2896 203/91
2,923,749 A * 2/1960 Lee .................... B01D 61/3641 585/819

(Continued)

FOREIGN PATENT DOCUMENTS

CN 103017397 A 4/2013
CN 104085935 A 10/2014

(Continued)

OTHER PUBLICATIONS

"Nanophotonics-enabled solar membrane distillation for off-grid water purification", Proceedings of the National Academy of Sciences, vol. 114, No. 27, 2017, https://doi.org/10.1073/pnas.1701835114.*

(Continued)

*Primary Examiner* — Jonathan Luke Pilcher
(74) *Attorney, Agent, or Firm* — Osha Bergman Watanabe & Burton LLP

(57) ABSTRACT

A method includes providing a resonant thermal oscillator in a thermofluidic system having at least two counter-flowing liquid streams separated by at least a spectrum absorbing material, wherein the spectrum absorbing material is hydrophobic, light-absorbing, and photothermal, and adjusting a flow rate in at least one of the counter-flowing liquid streams
(Continued)

to maximize heat transfer between the at least two counter-flowing liquid streams.

15 Claims, 34 Drawing Sheets

(51) Int. Cl.

| | |
|---|---|
| ***B01D 3/00*** | (2006.01) |
| ***C02F 1/00*** | (2023.01) |
| ***C02F 1/04*** | (2023.01) |
| ***C02F 1/14*** | (2023.01) |
| *C02F 1/44* | (2023.01) |
| *C02F 103/08* | (2006.01) |

(52) U.S. Cl.

CPC ........... *B01D 3/007* (2013.01); *B01D 61/364* (2013.01); *C02F 1/008* (2013.01); *C02F 1/043* (2013.01); *C02F 1/14* (2013.01); *B01D 2313/221* (2022.08); *B01D 2313/367* (2022.08); *C02F 1/447* (2013.01); *C02F 2103/08* (2013.01); *C02F 2209/02* (2013.01); *C02F 2209/40* (2013.01); *C02F 2303/10* (2013.01)

(56) References Cited

U.S. PATENT DOCUMENTS

| | | | | |
|---|---|---|---|---|
| 3,406,096 | A * | 10/1968 | Rodgers | B01D 63/084 202/172 |
| 5,300,197 | A * | 4/1994 | Mitani | B01D 61/3641 202/202 |
| 7,608,185 | B2 * | 10/2009 | Liao | B01D 63/043 202/202 |
| 9,140,503 | B2 * | 9/2015 | Milder | G01K 17/10 |
| 9,409,129 | B2 | 8/2016 | Duke et al. | |
| 11,344,847 | B2 * | 5/2022 | Laleg | B01D 61/364 |
| 2006/0144788 | A1 * | 7/2006 | Cath | B01D 61/364 210/640 |
| 2009/0152184 | A1 * | 6/2009 | Liao | B01D 61/3641 202/202 |
| 2009/0317631 | A1 * | 12/2009 | Yeom | B01D 61/025 428/338 |
| 2013/0255908 | A1 * | 10/2013 | Milder | F28F 27/00 165/11.1 |
| 2013/0277199 | A1 | 10/2013 | Summers et al. | |
| 2015/0218018 | A1 * | 8/2015 | Lee | C02F 1/447 210/321.72 |
| 2017/0246592 | A1 | 8/2017 | Li et al. | |
| 2018/0361320 | A1 * | 12/2018 | Laleg | G05B 17/02 |
| 2023/0067663 | A1 | 3/2023 | Alabastri et al. | |

FOREIGN PATENT DOCUMENTS

| | | | |
|---|---|---|---|
| CN | 110282804 | A | 9/2019 |
| EP | 4103298 | A1 | 12/2022 |
| WO | 2019113020 | A1 | 6/2019 |
| WO | 2021163568 | A1 | 8/2021 |

OTHER PUBLICATIONS

Alabastri et al., "Resonant energy transfer enhances solar thermal desalination", Energy Environ. Sci., Feb. 12, 2020, 13, 968-976.*

Office Action issued in Chilean Patent Application No. 202202180 mailed on Jul. 21, 2024 (15 pages).

Search Report issued in Chilean Patent Application No. 202202180, mailed on Jul. 22, 2024 (5 pages).

Office Action issued in counterpart Chinese Patent Application No. 202180014086.1 mailed on Apr. 23, 2024 (7 pages).

Office Action issued in Indonesian Application No. P00202209248, mailed on Jun. 7, 2023 (6 pages).

Office Action issued in European Application No. 21710762.2, mailed on Aug. 2, 2023 (10 pages).

Office Action issued in Canadian Application No. 3167129, mailed on Aug. 22, 2023 (3 pages).

Extended European Search Report issued in counterpart European Patent Application No. 24157139.7, mailed on May 22, 2024 (10 pages).

Office Action issued in Chinese Application No. 202180014086.1, mailed on Nov. 22, 2023 (19 pages).

International Search Report issued in International Application No. PCT/US2021/017965 dated Apr. 23, 2021 (4 pages).

Written Opinion issued in International Application No. PCT/US2021/017965 dated Apr. 23, 2021 (8 pages).

Summers, Edward K et al. "Experimental study of thermal performance in air gap membrane distillation systems, Including the direct solar heating of membranes" Desalination, Elsevier, Amsterdam, NL, vol. 330, Oct. 23, 2013, pp. 100-111, XP028760510 (12 pages).

Li, Qiyuan et al., "An integrated, solar-driven membrane distillation system for water purification and energy generation," Applied Energy, vol. 237, Mar. 1, 2019, pp. 534-548. https://doi.org/10.1016/j.apenergy.2018.12.069.

Ullah, Ruh et al., "Energy efficiency of direct contact membrane distillation," Desalination, vol. 433, May 1, 2018, pp. 56-67. https://doi.org/10.1016/j.desal.2018.01.025.

Guan, Guoqiang et al., "Evaluation of heat utilization in membrane distillation desalination system integrated with heat recovery," Desalination, vol. 366, 2015, pp. 80-93. https://doi.org/10.1016/j.desal.2015.01.013.

Lin, Shihong et al., "Direct contact membrane distillation with heat recovery: Thermodynamic insights from module scale modeling," Journal of Membrane Science, vol. 453, Mar. 1, 2014, pp. 498-515. https://doi.org/10.1016/j.memsci.2013.11.016.

* cited by examiner

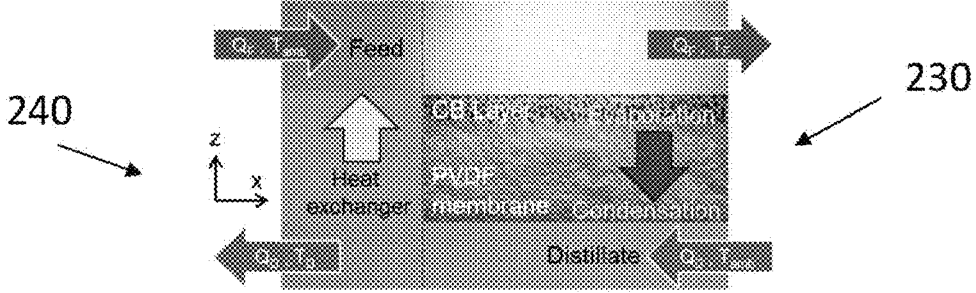
Fig. 2B
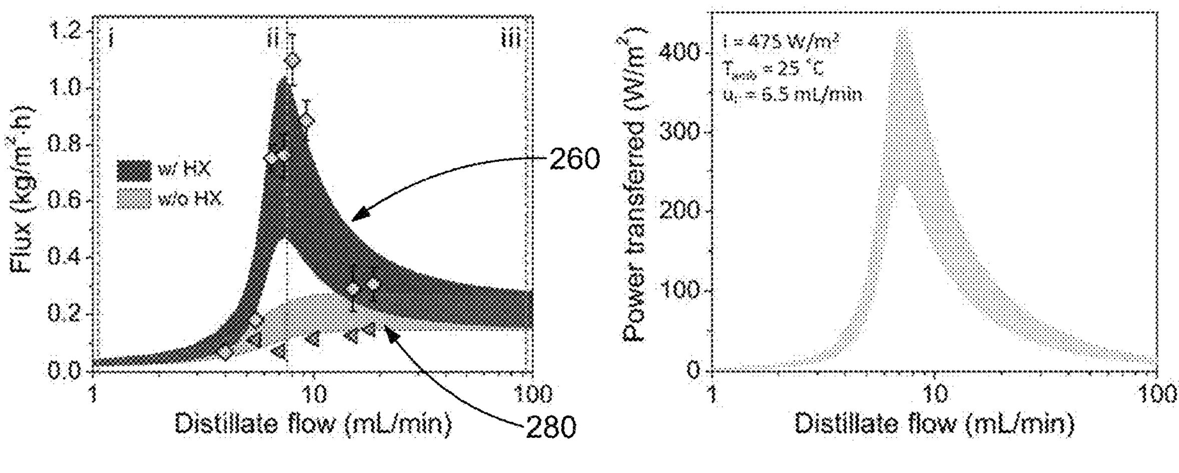
Fig. 2C
Fig. 2D

Fracking water

Before

After

WHO Standard

Concentration (mg/L)

$10^4$ $10^3$ $10^2$ $10^1$ $10^0$ $10^{-1}$ $10^{-2}$ $10^{-3}$

Ca K Mg Na Sr Fe Pb

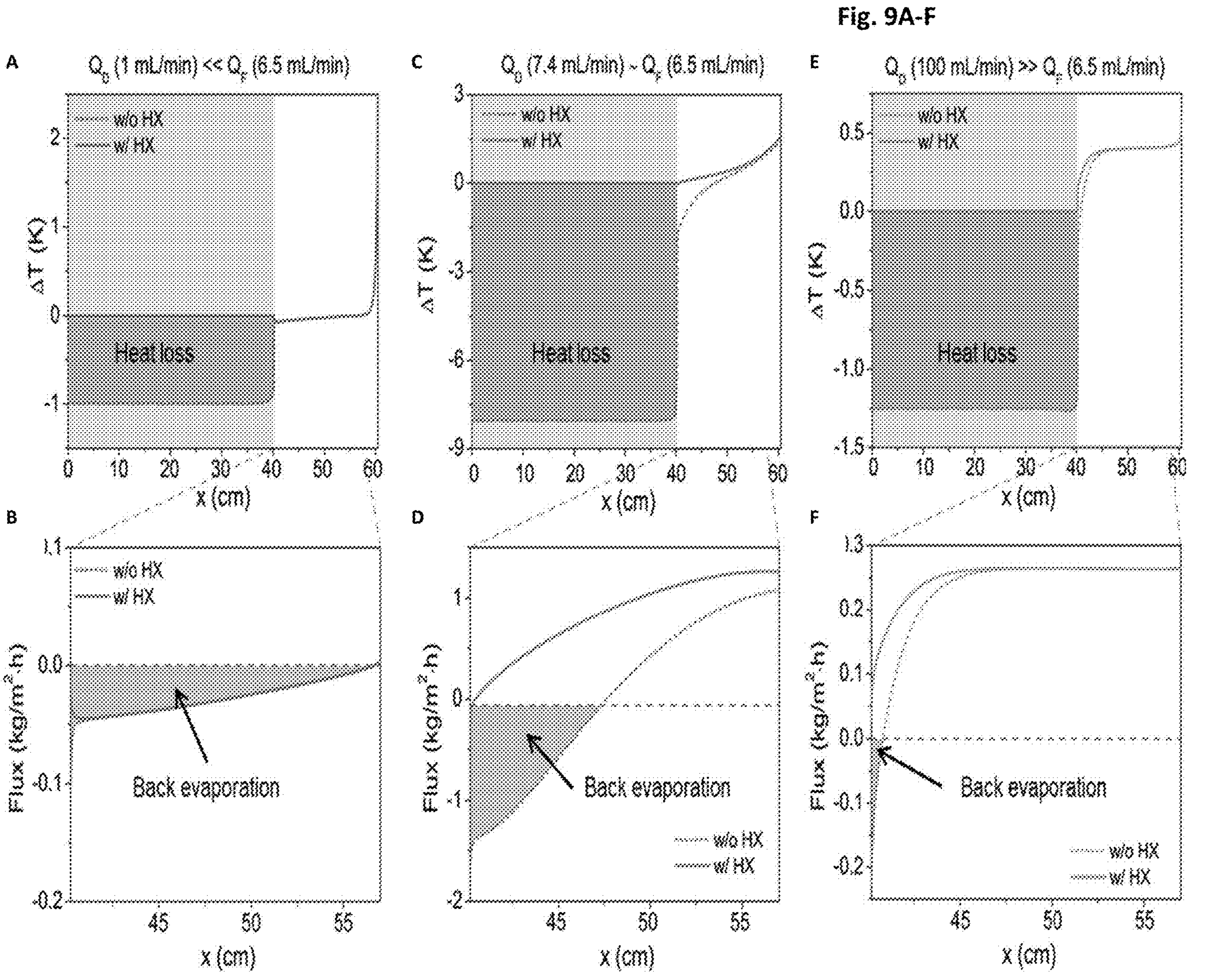
Fig. 9A-F
A
$Q_0$ (1 mL/min) << $Q_F$ (6.5 mL/min)
w/o HX
w/ HX
Heat loss
ΔT (K)
x (cm)
B
w/o HX
w/ HX
Back evaporation
Flux (kg/m²·h)
x (cm)
C
$Q_0$ (7.4 mL/min) ~ $Q_F$ (6.5 mL/min)
w/o HX
w/ HX
Heat loss
ΔT (K)
x (cm)
D
Back evaporation
w/o HX
w/ HX
Flux (kg/m²·h)
x (cm)
E
$Q_0$ (100 mL/min) >> $Q_F$ (6.5 mL/min)
w/o HX
w/ HX
Heat loss
ΔT (K)
x (cm)
F
Back evaporation
w/o HX
w/ HX
Flux (kg/m²·h)
x (cm)

Fig. 10A-B
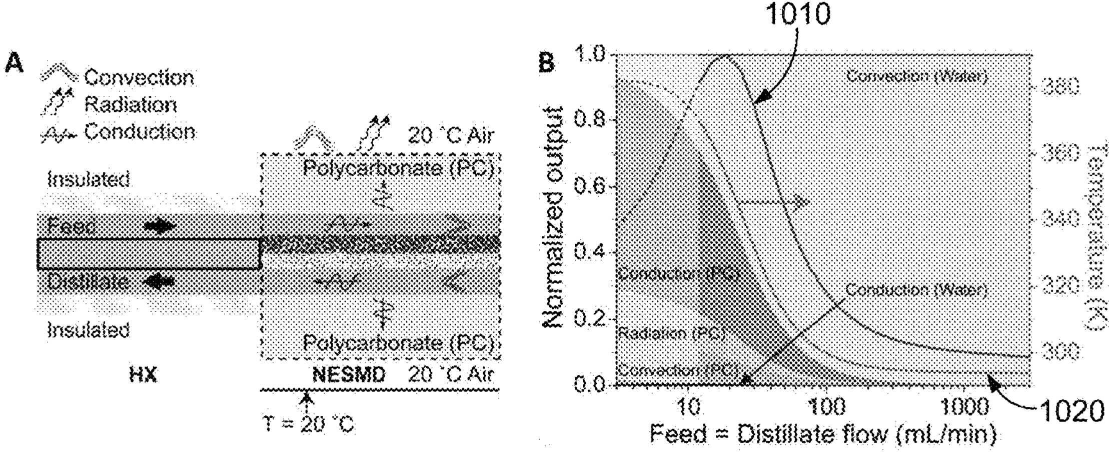

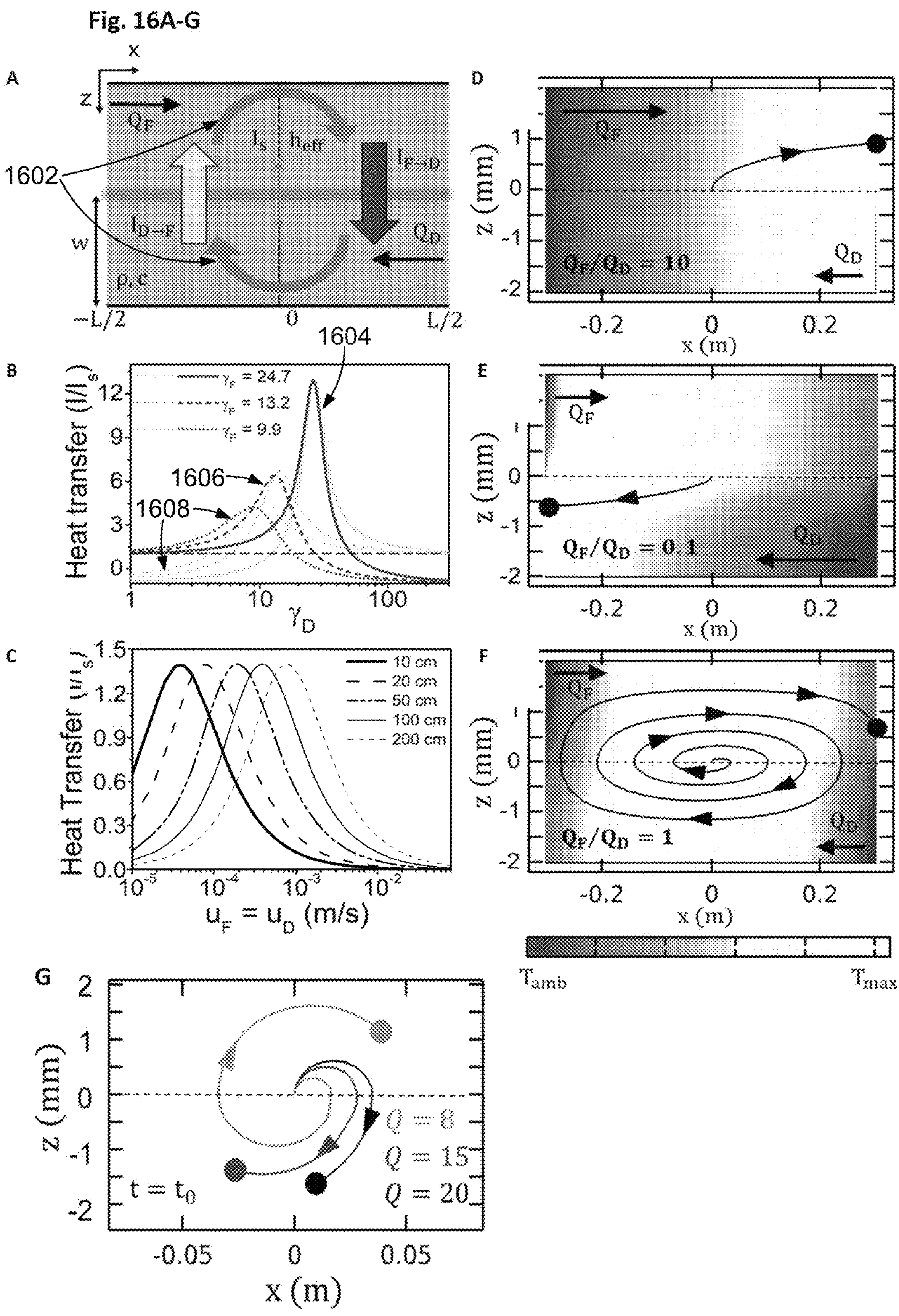
Fig. 16A-G
A
B
C
D
E
F
G
1602
1604
1606
1608
Heat transfer (I/I_s)
Heat Transfer (I/I_s)
γ_D
u_F = u_D (m/s)
10 cm
20 cm
50 cm
100 cm
200 cm
γ_F = 24.7
γ_F = 13.2
γ_F = 9.9
Q_F/Q_D = 10
Q_F/Q_D = 0.1
Q_F/Q_D = 1
z (mm)
x (m)
T_amb
T_max
Q = 8
Q = 15
Q = 20
t = t_0

Cloudy Days

Sunny Days

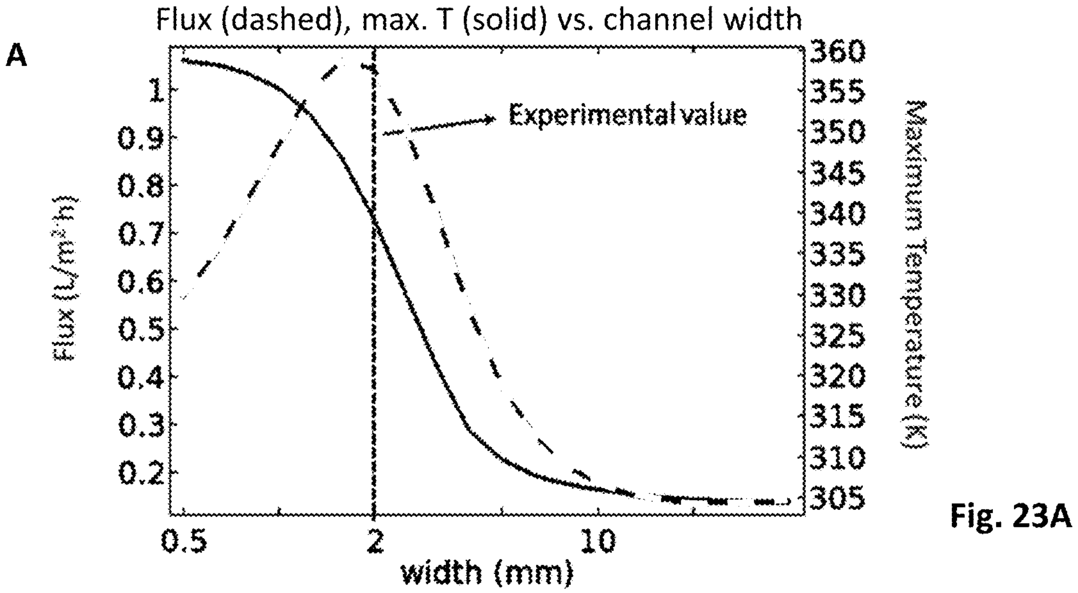
Fig. 23A
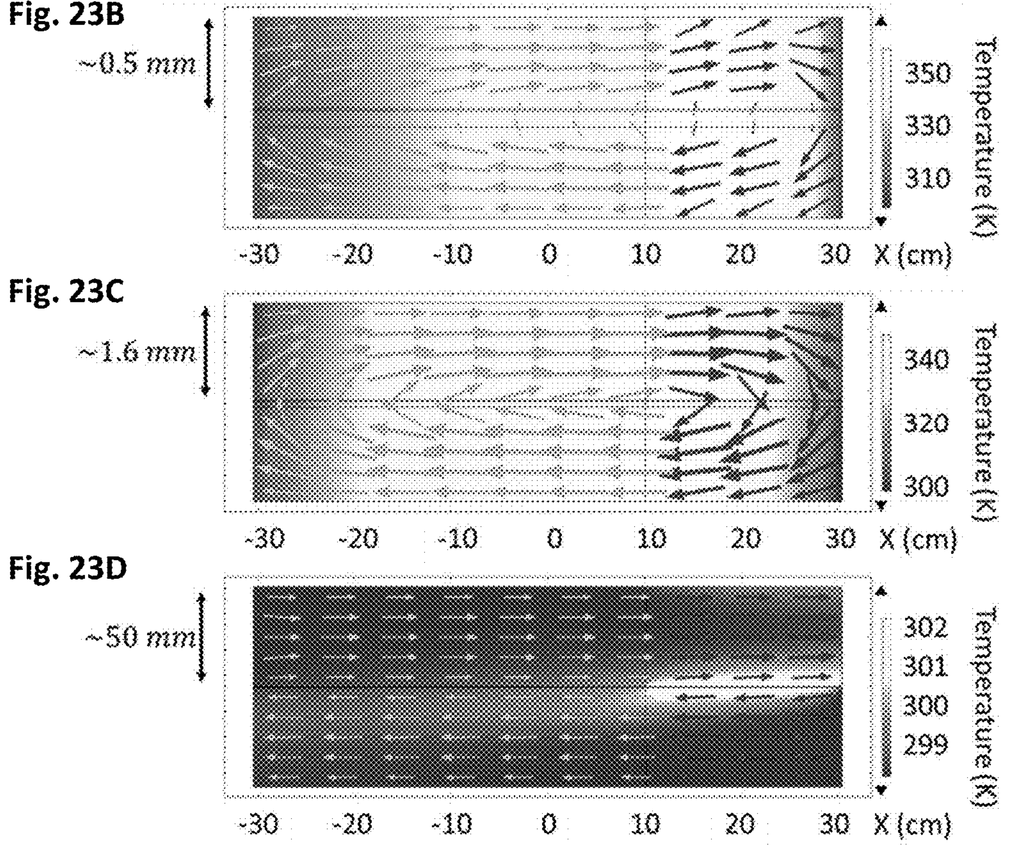
Fig. 23B
Fig. 23C
Fig. 23D

RESONANT THERMAL OSCILLATOR TO IMPROVE OUTPUT OF A THERMO-FLUIDIC SYSTEM

CROSS-REFERENCE TO RELATED APPLICATIONS

This application claims priority from U.S. Provisional Application No. 62/975,747 filed on Feb. 12, 2020 in the United States. U.S. Provisional Application No. 62/975,747 and all related appendices are expressly incorporated in their entirety.

STATEMENT REGARDING SPONSORED RESEARCH OR DEVELOPMENT

This invention was made with Government Support under Grant Numbers EEC-1449500 awarded by the National Science Foundation and Grant Number FA9550-15-1-0022 awarded by the Air Force Office of Scientific Research. The government has certain rights in this invention. This invention was also funded in part under Grant Number H20398 awarded by Carl and Lillian Illig Fellowship, and Grant Number H20803 awarded by Texas Instrument Visiting Professorship.

BACKGROUND OF THE INVENTION

With the ever-increasing demand for fresh water availability, current water treatment methods face the major limitation of low fresh water recovery from highly saline sources like seawater, brackish and processed water due to high concentrations of dissolved solids, which make filtration techniques ineffective and pressure-based approaches impractical. A potential solution to the clean water crisis is off-grid solar thermal desalination technology, developed with modular designs combining lightweight and cost-effective materials. These qualities make solar thermal desalination a promising approach for high-salinity water purification, with potential applications in areas lacking access to conventional electrical power. The main limitation of any evaporation-based desalination process is its intrinsically low thermodynamic efficiency due to its reliance on energy-intensive phase change.

The development of this invention was funded in part by the Robert A. Welch Foundation Grant Numbers C-1220 and C-1222.

BRIEF SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to systems that include a nanophotonics-enabled solar distillation system, a dynamic heat recovery (HX) system, at least two counter-flowing liquid streams separated by at least a spectrum absorbing material, wherein the at least one counter-flowing liquid streams comprises a feed stream and a distillate stream, and wherein the spectrum absorbing material is hydrophobic, light-absorbing, and photothermal.

In another aspect, embodiments of the present disclosure relate to methods that include combining a nanophotonics-enabled solar distillation system and a dynamic heat recovery system as a coupled system when at least two counter-flowing liquid streams separated by a spectrum absorbing material comprising a feed stream and a distillate stream are matched, recycling a heat energy into the feed stream by the coupled system of the nanophotonics-enabled solar distillation system and the dynamic heat recovery system, and enabling an operation, by the coupled system of the nanophotonics-enabled solar distillation system and the dynamic heat recovery system, when no light is incident on the coupled system.

In yet another aspect, embodiments disclosed herein relate to methods that include providing a resonant thermal oscillator in a thermofluidic system having at least two counter-flowing liquid streams separated by at least a spectrum absorbing material, wherein the spectrum absorbing material is hydrophobic, light-absorbing, and photothermal, and adjusting a flow rate in at least one of the counter-flowing liquid streams to maximize heat transfer between the at least two counter-flowing liquid streams.

Other aspects and advantages of the claimed subject matter will be apparent from the following description and the appended claims.

BRIEF DESCRIPTION OF THE DRAWINGS

FIG. 2B shows a schematic of an unfolded system in accordance with one or more embodiments.

FIG. 2C shows an example of flux in a TDO for different distillate flows in accordance with one or more embodiments.

FIG. 2D shows an example of power transfer in a TDO for different distillate flows in accordance with one or more embodiments.

FIG. 9A shows temperature difference along the length across a metal inline HX membrane in NESMD in accordance with one or more embodiments.

FIG. 9B shows a purified water flux through a membrane in NESMD in accordance with one or more embodiments for $Q_D$ (1 mL/min)<<$Q_F$ (6.5 mL/min).

FIG. 9C shows the temperature difference in systems with and without an HX module for $Q_D$ (7.4 cm)~$Q_F$ (6.5 mL/min).

FIG. 9D shows the flux through a membrane with and without an HX module for $Q_D$ (7.4 cm)~$Q_F$ (6.5 mL/min).

FIG. 9E shows the temperature difference with and without an HX module for $Q_D$ (100 mL/min)>>$Q_F$ (6.5 mL/min).

FIG. 9F shows the flux through the membrane with (solid lines) and without (dashed lines) HX for $Q_D$ (100 mL/min)>>$Q_F$ (6.5 mL/min).

FIG. 10A shows a schematic of the TDO system showing different heat loss mechanisms in the two parts of a coupled system in accordance with one or more embodiments.

FIG. 10B shows conduction, convection and radiation losses and maximum output in a polycarbonate window layer and water channels in accordance with one or more embodiments.

FIG. 16A shows two interacting channels of length and thickness and two counter-current flows, $Q_F$ and $Q_D$, separated by a heat conductor and heat source $I_s$.

FIG. 16B shows heat transfer enhancements (normalized to $I_s$) for $I_{F\rightarrow D}$ and $I_{F\rightarrow D}$ as functions of $Q_D$ with fixed $Q_F$ and $h_{eff}$=200 W/m$^2$/K, L=24 in, c=4.18 kJ/kg/K, ρ=1 g/cm$^3$.

FIG. 16C shows exchanged heat flux enhancement dependence on matched flows for different module sizes.

FIG. 16D shows calculated temperature map for $Q_F$=20 mL/min and $Q_D$=2 mL/min.

FIG. 16E shows calculated temperature map for $Q_F$=20 mL/min and $Q_D$=200 mL/min.

FIG. 16F shows calculated temperature map for $Q_F$=$Q_D$=20 mL/min.

FIG. 16G shows probe trajectories in a TDO system at different resonant conditions.

and 21B shows solar desalination with resonant thermal oscillator with energy storage powers after hours processing for sunny days.

Figure 22:
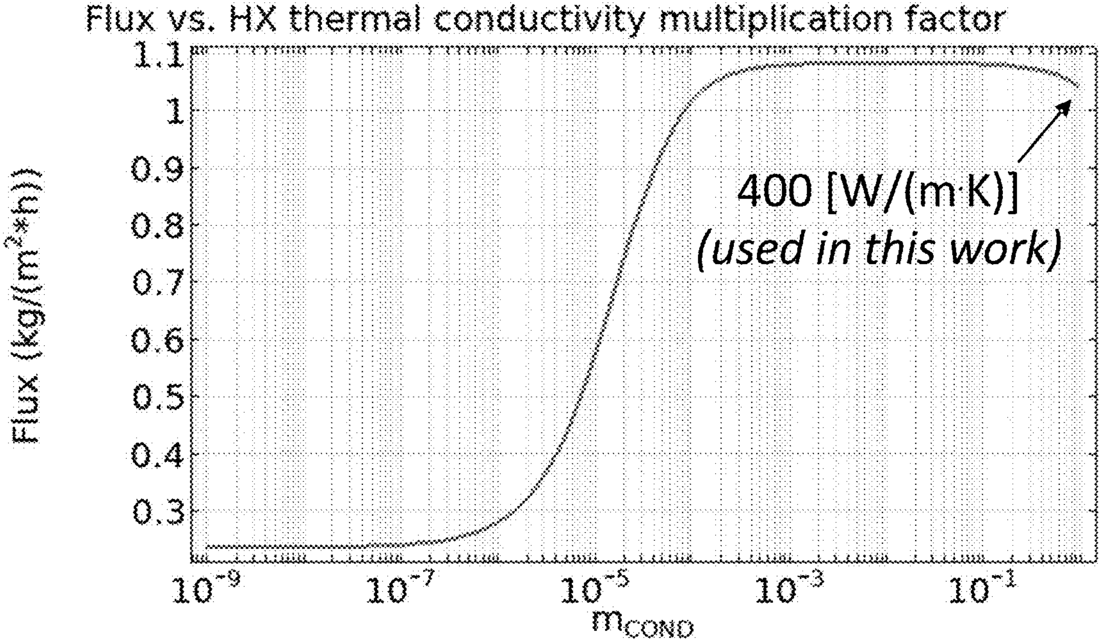

FIG. 22 shows the effect of a reduction of thermal conductivity of an HX material.

FIG. 23A shows the fresh water flux rate and maximum temperature in the system when the thickness of feed and distillate channels (w) is changed from ~0.5 mm to ~50 mm.

FIG. 23B shows temperature and heat flux vector fields for the case of w~0.5 mm.

FIG. 23C shows temperature and heat flux vector fields for the case of w~1.6 mm.

FIG. 23D shows temperature and heat flux vector fields for the case of w~50 mm.

Figure 24:
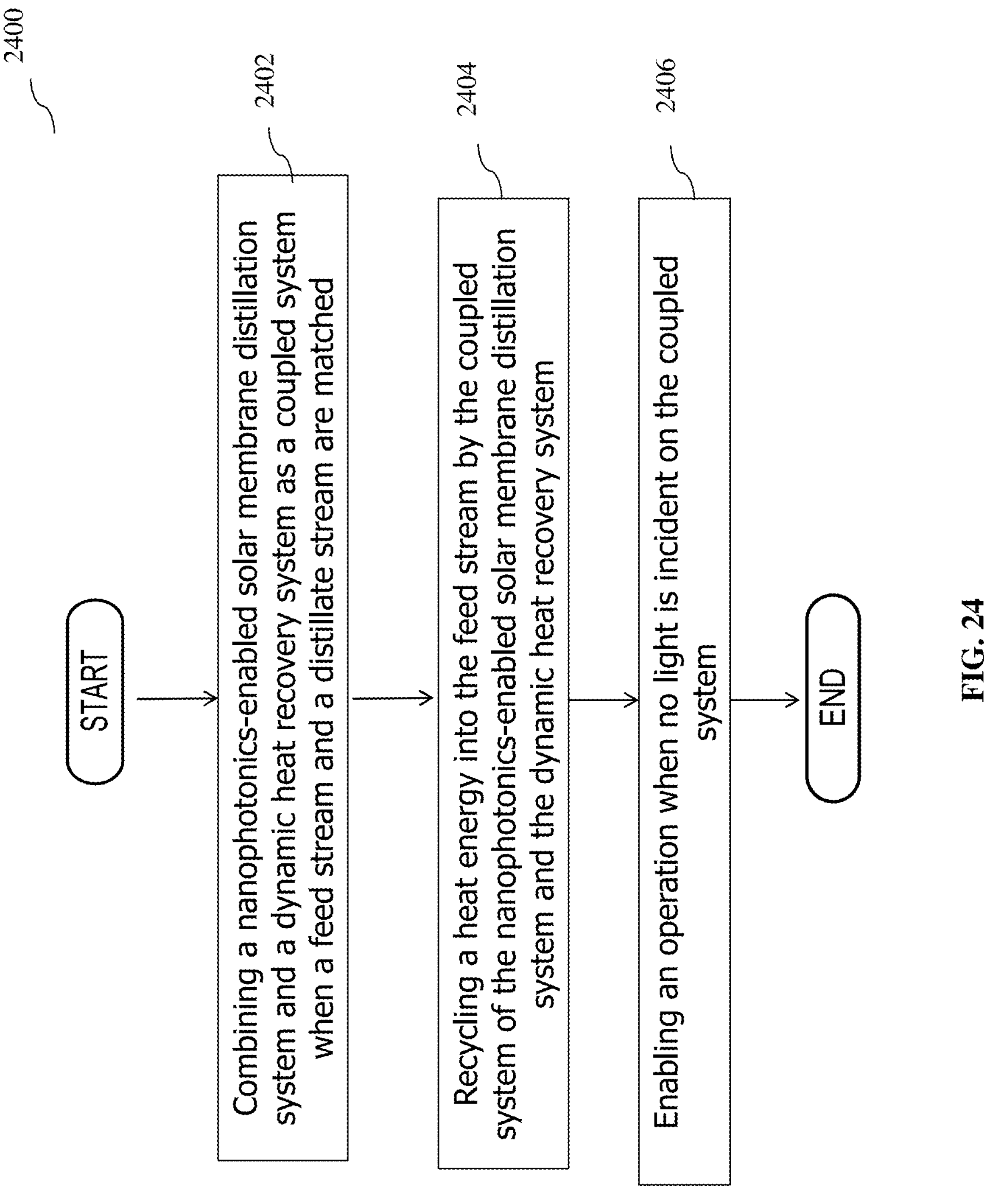

FIG. 24 shows a flowchart describing methods for a resonant thermal oscillator in a thermos-fluidic system in accordance with one or more embodiments.

DETAILED DESCRIPTION OF THE INVENTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In the following description, any component described with regard to a figure, in various embodiments of the present disclosure, may be equivalent to one or more like-named components described with regard to any other figure. For brevity, at least a portion of these components are implicitly identified based on various legends. Further, descriptions of these components may not be repeated with regard to each figure. Thus, each and every embodiment of the components of each figure is incorporated by reference and assumed optionally present within every other figure having one or more like-named components. Additionally, in accordance with various embodiments of the present disclosure, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before,” “after,” “single,” and other such terminology. Rather, the use of ordinal numbers is to distinguish between the elements. By way of an example, a first element is distinct from a second element, and the first element may encompass more than one element and succeed (or precede) the second element in an ordering of elements, if an ordering exists.

The term solar is understood to include any source that is capable of emitting solar energy, including natural sources, such as the sun, and artificial light sources, such as LED, lasers, and nanoscale light emitters.

Embodiments of the present disclosure relate to thermofluidic systems with oscillating thermal elements. For example, embodiments of the present disclosure may include thermofluidic systems coupled with a heat resonator, where thermal energy may be confined and recycled multiple times through a combination of heat transfer effects. Thermofluidic systems may include thermofluidic separation systems based on phase change separation methods.

In some embodiments, thermofluidic systems may include solar-driven photothermal distillation systems, where at least a portion of the required heat of vaporization may be provided by solar energy. Solar-driven photothermal distillation systems of the present disclosure may include a resonant heat exchanger system to achieve solar distillation of fluids in the absence of solar energy.

In some embodiments, thermofluidic systems may include a desalination system with nanoparticulate solar spectrum absorbing material and a resonate heat exchange system. The resonant heat exchange system may use thermal energy storage mechanisms, referred to as resonant energy exchange (REX), to support a continuous recirculation of thermal energy. In some embodiments, the continuous recirculation of thermal energy may store the required thermal energy to operate in the absence of a solar source.

Embodiments of the present disclosure may include cyclical heat transfer mechanisms where thermal energy is captured, stored, and transferred between at least two countercurrent fluid flows in light absorbing systems of variable sizes. For example, embodiments of the present disclosure may combine internally heated counter-current fluid flows and thermal conductors in a thermofluidic system, where the thermofluidic system behaves like a thermal oscillator. Oscillating thermal energy in embodiments of the present disclosure may support continuous thermal processes, such as phase separations or temperature dependent chemical reactions. Further, operating these light-absorbing oscillating systems at a resonant condition may increase energy efficiency, particularly in the use of stored energy. Accordingly, embodiments of the present disclosure may be characterized as thermal oscillators, in that embodiments may use properties of oscillators, such as resonance, to control temperature, increase stored energy, and coupling within system networks. According to the present disclosure, resonance may occur when interacting fluid flow rates are equal. Resonance in embodiments of the present disclosure may optimize the exchanged heat, the peak temperature, and the stored thermal energy.

Resonance in thermal oscillators may maximize the internal energy, such as mechanical, electrical, magnetic, and electromagnetic energy, and minimize losses. The oscillating thermal elements of embodiments of the present disclosure may exhibit a large thermal inertia at resonance. This means that the system may exhibit minimal losses and maximum response time to external stimuli. For example, if an external heat source, such as a solar heat source, is switched off, the system may maintain internal energy because of the oscillating internal heat fluxes, which prevent thermal energy loss from the system to the environment. Moreover, as different oscillators can be coupled together, embodiments of the present disclosure may include additional applications where thermal elements are connected in a network and where the spatial distribution of temperature may be controlled by tuning the input flow rates. This possibility can have applications ranging from large scale solar driven systems to microfluidic devices where laser illuminated nanoparticles embedded in the micro-channels may serve as small-scale heaters.

According to embodiments of the present disclosure, thermal oscillation systems may be used in Photo-Thermo-Fluidic System (PTFS) that may perform as a heat resonator, where thermal energy may be confined and recycled multiple times through a combination of heat transfer mechanisms. PTFS may include at least two flowing fluids in countercurrent configurations separated by at least a solar energy absorbing thermally conductive layer between the fluid channels. Upon illumination, the electromagnetic radiation may be dissipated into heat energy within the thermally conductive layer. The heat may be transferred in antiparallel directions by the countercurrent flows, thus generating an opposite temperature gradient across the at least two fluids. The temperature difference transfers heat between the channels in a cyclical, oscillating manner. The oscillation of the heat energy in the system may minimize the thermal energy loss through flow outlets. This oscillation may allow the accumulation of thermal energy within the at least two fluids and may be controlled by tuning the relative flow rates. A resonance condition may be achieved when the flow rates are set to equal. In some embodiments of the present disclosure, a resonant condition may be achieved by tuning a single flow rate, such as a feed flow rate, where the fluid flow may be provided in a countercurrent configuration (e.g., by folding or looping back the flow path).

Figure 1:
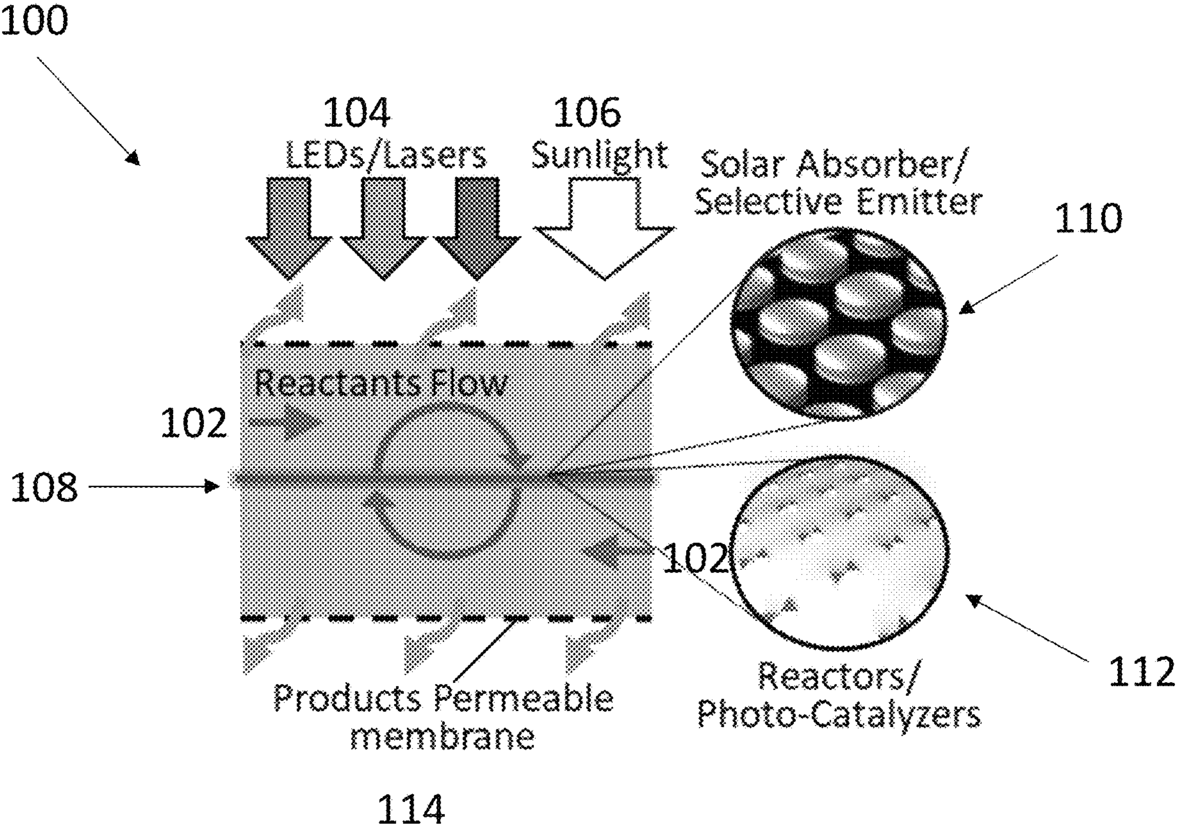
FIG. 1 shows a schematic of a PTFS light powered chemical reactor.

In some embodiments, resonant heat transfer may enhance reaction rates in properly designed PTFSs under both artificial and natural illuminations by increasing the temperature in the system. Embodiments of the present disclosure may also use thermal batteries at resonance where thermal energy is stored in PTFSs and heat can be quickly released upon request by detuning system flow rates from resonant condition. Embodiments of the present disclosure may also include two PTFSs with different resonant conditions coupled to exchange stored thermal energy. In FIG. 1, a schematic of a PTFS light powered chemical reactor 100 is shown where liquid phase reactants 102 (arrows) flow in the reactor in opposite directions. Artificial light 104 and natural light 106 sources are shown interacting with a nanostructured surface 108 with a solar absorber/selective emitter 110 (shown enlarged) and a reactor/photocatalyzer 112 (shown enlarged) tailored to retain heat and catalyze target chemical reactions. The products are shown collected through selective permeable membranes 114.

In some embodiments of the present disclosure, resonant heat transfer as previously described may be coupled with solar desalination to provide storage of solar energy in the absence of a solar source. For example, for systems powered by the sun, desalination operations according to embodiments of the present disclosure may provide partial fresh water generation through the night.

For example, experimental data from embodiments using resonance in a thermal oscillator (REX) to enhance a desalination system demonstrated that oscillating thermal elements have increased solar thermal desalination efficiency by more than ten times compared with non-resonant systems. In such embodiments, coupled membrane distillation and heat recovery systems may behave as a resonant thermal desalination oscillator (TDO), where distillate output may be at a resonance condition. In other words, a TDO may employ REX to a desalination application. The REX system may act as a thermal battery to provide continuous thermal energy for the TDO. Tuning a feed flow and a distillate flow through TDO systems as a function of illumination intensity may be useful for achieving an optimized oscillator, which may also depend on module size and thermal losses. In an example highly compact dynamic TDO system, a 500% increase in distillate flux on resonance compared to a non-resonant system may be observed, demonstrating 1.1 $kg/m^2$ h fresh water generation and collection under 475 $W/m^2$ irradiation. Therefore, one or more embodiments may use intensity-dependent dynamic input flow control to maintain system optimization throughout an entire day of operation. One or more embodiments of the present disclosure may also use a more general resonant phenomena using a simple model to theoretically analyze the key principles behind resonant energy transfer. In some embodiments, a resonant system may maximize distillate output at varying light intensities by adjusting feed flow (e.g., by controlling the flow rate of feed flowing into the system using one or more flow control devices, such as a valve or choke).

Embodiments of the present disclosure may include channels to direct fluid flow through thermofluidic systems disclosed herein. Channels may be understood to include any structure where fluid flow may be multipurpose, such as chemical reaction chambers (where input fluids may act as reactants and may be converted into products due to increased temperatures), thermal storage units (where accumulation and release of heat may be controlled by input flows), water purification systems, or fluid separation systems (where temperature gradients between the flows may promote the latent heat of evaporation to be exchanged between the channels).

Embodiments of the present disclosure may include gaseous or liquid input and output fluids. While some examples of thermofluidic systems disclosed herein describe water solution inputs (e.g., brackish water or saline) for desalination, other fluids may be used with the disclosed systems for different purposes using the same heat exchanging concepts disclosed herein. For example, various fluid types may be flowed through thermofluidic systems disclosed herein to achieve one or more chemical reactions under cycling heat conditions. In such embodiments, the heat exchange concepts disclosed herein may be used to accelerate certain chemical reactions, for example. In some embodiments, various fluid types may be flowed through thermofluidic systems disclosed herein to provide thermal oscillation between the fluid flow, thereby allowing the system to act as a thermal battery for various applications.

NESMD Systems

According to embodiments of the present disclosure, PTFS may include nanophotonics-enabled solar membrane distillation (NESMD) systems. One or more embodiments of the present disclosure focus on coupling between a NESMD system and a dynamic heat recovery (HX) system. In contrast to conventional membrane distillation systems, NESMD systems may have membranes that include any porous surface with at least a reactive layer or coating, and may also be referred to as a porous surface layer. In some embodiments NESMD and HX processes may be combined to recover much of the heat of condensation from a distillate, reusing it to pre-heat a feed, or input/inlet stream. A NESMD system coupled with an HX and operated at resonance may be an example of an REX where REX represents the use of resonant heat transfer to enhance an application.

Figure 2A:
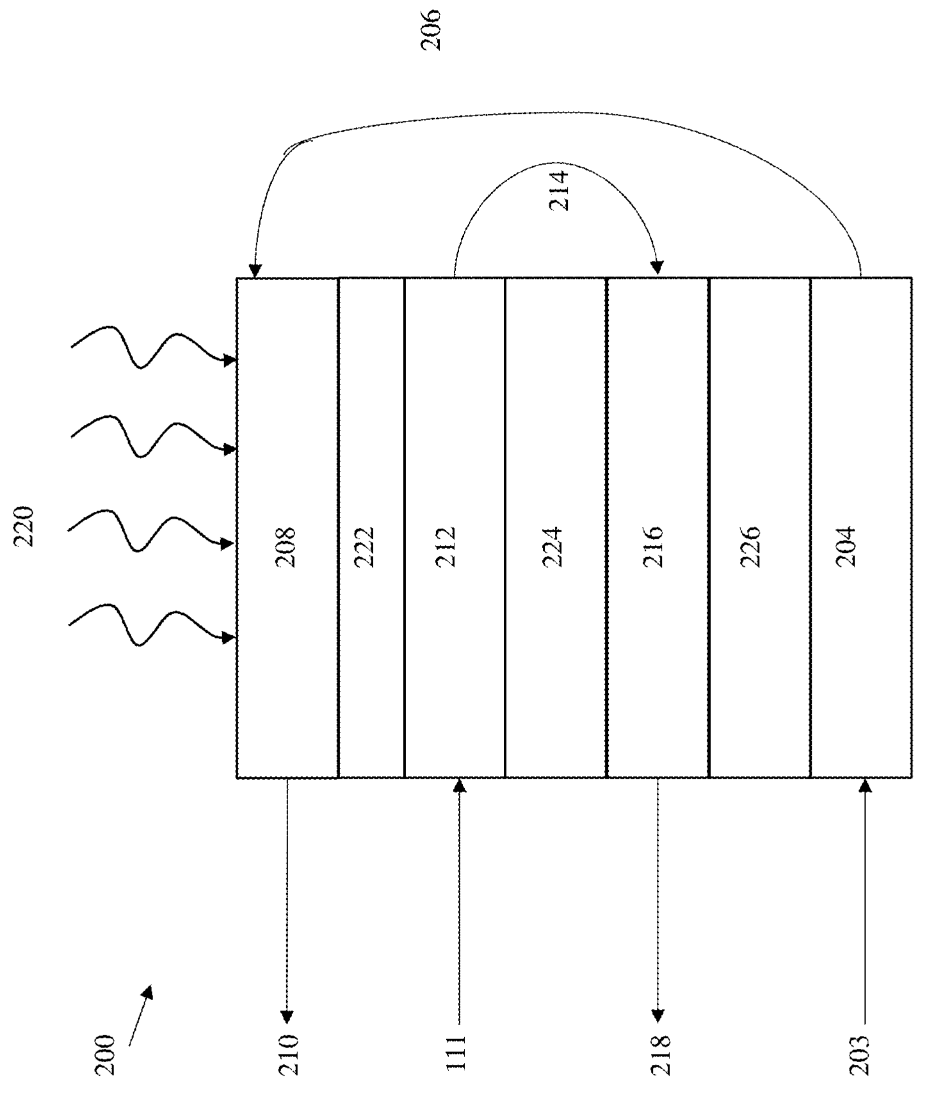
FIG. 2A shows an example of a NESMD module and a coupled dynamic heat recovery system HX module in accordance with one or more embodiments.

FIG. 2A shows an example of a NESMD module and a dynamic heat recover system HX module coupled in system 200. FIG. 2A shows channel 204 ("feed in") through which a fluid feed from line 203 may traverse or flow through. Channel 204 is connected or coupled to channel 208 ("feed out") via line 206 through which the fluid feed may exit the system via line 210. Also shown in FIG. 2A is channel 212 ("distillate in") through which a distillate from line 211 may traverse or flow through. Channel 212 is connected or coupled to channel 216 ("distillate out") via line 214 though which a distillate may exit the system via line 218. FIG. 2A also shows solar irradiation 220 (curvy arrows), wherein channel 208 is configured to receive solar irradiation 220. Also shown in FIG. 2A is a NESMD module 222 connected or coupled to channel 208 and channel 212. Air gap 224 is shown between channel 212 and channel 216. Also in FIG. 2A, a heat exchanger system, HX module 226 is shown coupled to channel 204 and channel 216.

In one or more embodiments, in its simplest form, a NESMD system may include two countercurrent flows, saline feed and purified distillate separated by a hydrophobic, light-absorbing membrane. For example, FIG. 2A shows an example of a folded system having a NESMD module 222 layered over an HX module 226. The NESMD and HX modules may be formed on a large scale (e.g., covering an area of many meters) or on a small scale (e.g., covering an area of a few square millimeters or a few square centimeters to hundreds of square centimeters). In particular, an incoming saline feed (e.g., "Feed In" channel 204 in FIG. 2A) may be in thermal contact with an outgoing distillate (e.g., "Distillate out" channel 216 in FIG. 2A) via an HX (e.g., HX module 226 in FIG. 2A). The feed is further heated from a photothermal membrane present in a NESMD module (e.g., NESMD module 222 in FIG. 2A). FIG. 2B shows a schematic of an unfolded system with 10.2 cm×20.3 cm NESMD module 230 and 10.2 cm×40.6 cm inline HX module 240.

FIGS. 2C and 2D show examples of flux and power transfer in a TDO for different distillate flows in accordance with one or more embodiments.

In some embodiments, sunlight may be converted into heat on the feed side through photothermal heating by light-absorbing nanoparticles embedded in a porous surface layer forming a membrane. The induced temperature gradient across the membrane results in water evaporation on the feed side and condensation on the distillate side. The continuous, localized heating at the feed/membrane interface due to incident sunlight makes NESMD size scalable and avoids temperature polarization, overcoming two main drawbacks of conventional membrane distillation. The inclusion of NESMD in embodiments of the present disclosure improves thermal efficiency due, in part, to the increase in temperature of the micro-thin layer of water at the photothermal porous surface layer where the water temperature is increased by the heat produced by the absorbed light.

In embodiments of the present disclosure, the nanophotonic enabled membrane may be hydrophobic and allow water vapor but not liquid or particulates to flow through. A NESMD membrane may include a hydrophobic porous surface layer and a reactive layer or coating covering the porous surface layer. For example, a NESMD membrane may include a hydrophobic porous surface layer and a reactive layer embedded with highly light-absorptive carbon black (CB) nanoparticles. The porous surface layer may be thicker than the reactive layer. For example, the hydrophobic porous surface layer may be about 100 μm thick, and the reactive layer may be about 2-10 μm thick. In some embodiments of the present disclosure, the porous surface layer may be permeable by vapor but not liquid water and may be the layer proximate to the light. Further, in some embodiments, a porous surface layer may be a microstructured layer having designed pore sizes (e.g., pore sizes capable of allowing vapor to permeate through the microstructured layer and preventing liquid to flow through). Once generated, the distillate is brought into thermal contact with the saline feed for heat exchange, as shown in FIGS. 2A and 2B. Thermal contact may be achieved through a copper or aluminum sheet, or any material with a similar thermal conductively, incorporated into the flow structure. In practice, folding the HX module below the NESMD module avoids increasing the system footprint, which would allow a high density of NESMD modules to be positioned within a compact area.

Figures 2E, 2F, 2G, 2H:
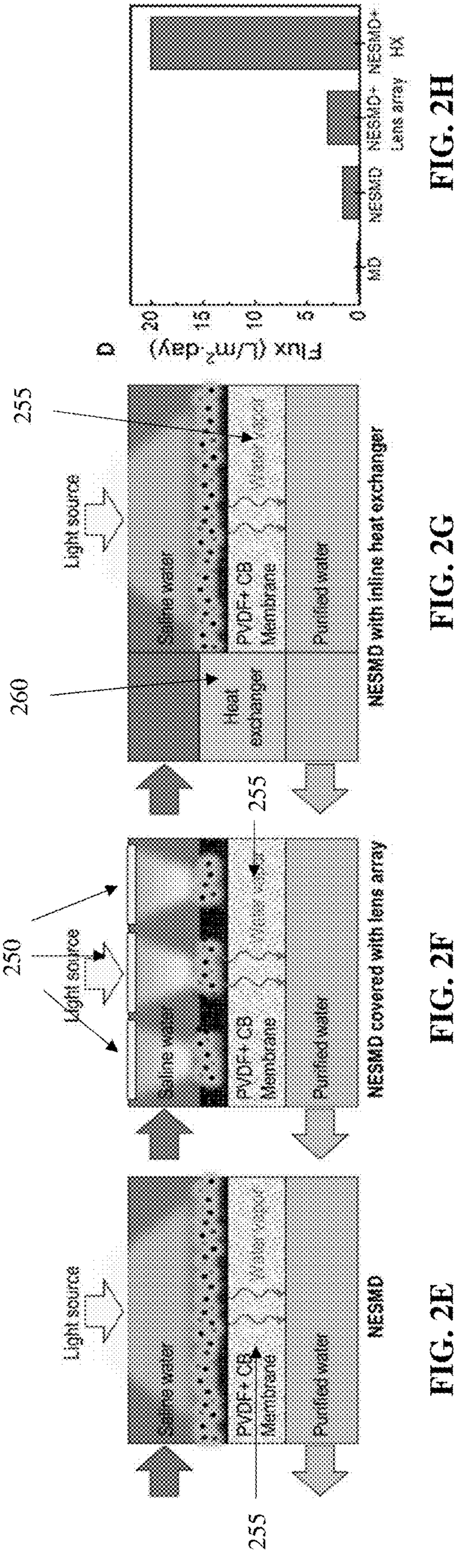
FIG. 2E shows a schematic of a NESMD module without an HX module.
FIG. 2F shows a schematic of a NESMD module with focusing elements without an HX module.
FIG. 2G shows a schematic of a NESMD module with an HX module.
FIG. 2H shows the distillate flux rates of systems, including systems in accordance with one or more embodiments.

As shown in FIGS. 2E-2H, NESMD modules coupled with HX modules may improve the overall efficiency of the system. FIGS. 2E and 2F show schematics of a NESMD module without an HX module. The efficiency of a NESMD module may be improved by incorporating a lens array 250 that generates thermal hot spots on the photothermal membrane 255, as shown in FIG. 2F. The nonlinear dependence of the saturation vapor pressure of water on temperature and light intensity may increase the water production rate by >50% for the same input solar power. In embodiments of the present disclosure, an inline HX module, such as inline HX module 260 in FIG. 2G, may further increase system efficiency by using the heat in the purified distillate to preheat the incoming saline feed. The coupling of the NESMD system with the HX module 260 is exemplary of the REX principle, which may boost distillate flux rates by 500%, increasing the purified water production capacity to ~20 $L/m^2 \cdot day$ (See FIG. 2H).

Figures 2J, 2K:
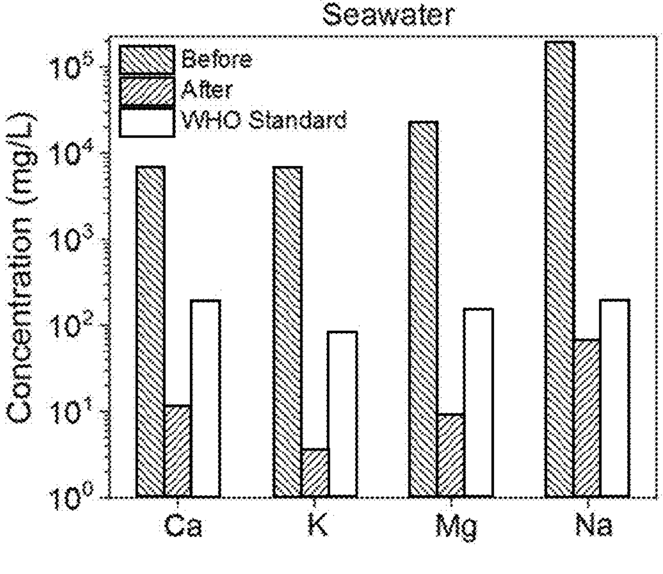
FIG. 2J shows ion concentration after seawater treatment from systems in accordance with one or more embodiments.
FIG. 2K shows ion concentration after fracking water treatment from systems in accordance with one or more embodiments.

Nanoparticle-assisted distillation of embodiments of the present disclosure may generate fresh water from seawater (see FIG. 2J) and fracking water (FIG. 2K) by reducing ion concentrations to below the standard limits of the World Health Organization.

As discussed above, NESMD systems may include two or more independently controlled flows, such as a feed in flow line and distillate in flow line (e.g., "Feed In" channel 204 and "Distillate out" channel 216 in FIG. 2A). In some embodiments, a PTFS system have a single flow inlet, for example in a solar thermal resonant energy exchange desalination (STREED) system, discussed below.

STREED Systems

According to embodiments of the present disclosure, PTFS may include STREED systems. STREED systems may combine nanoparticulate solar spectrum-absorbing material and a dynamic heat recovery (HX) system. In some embodiments, the nanoparticulate solar spectrum-absorbing material and HX system can be combined to recover much of heat of condensation from the distillate, reusing the heat to pre-heat the feed.

Figure 3A:
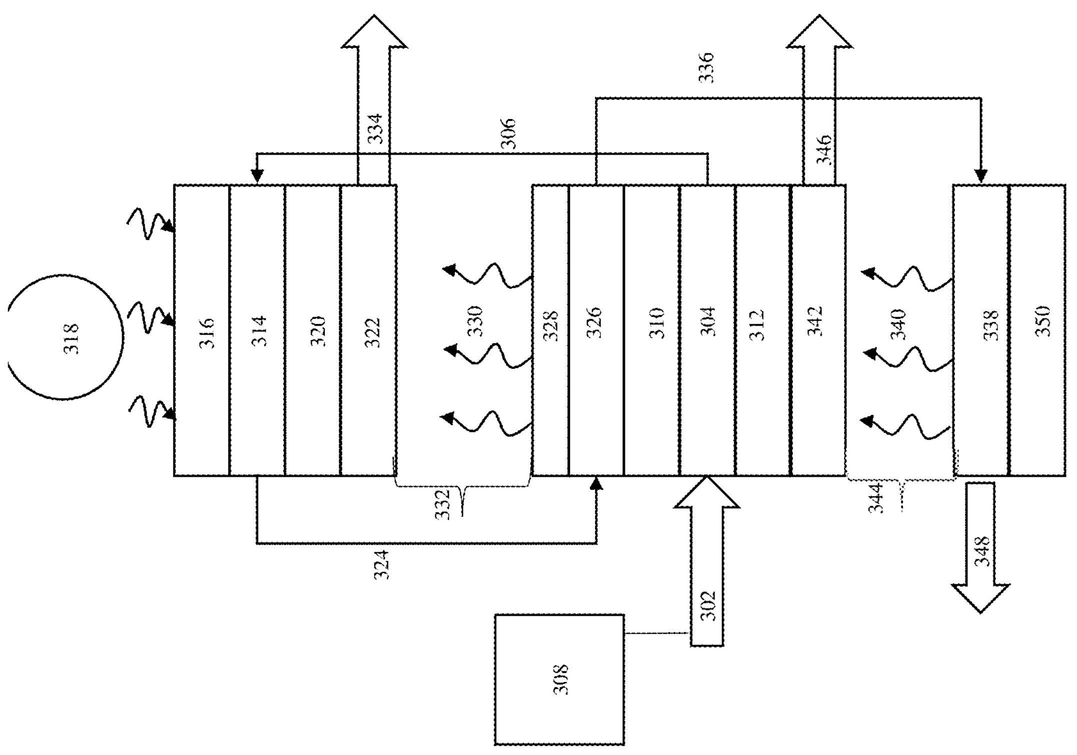
FIG. 3A shows an example of a STREED module in accordance with one or more embodiments.

FIG. 3A shows an illustration of a desalination system 300 for the desalination of a saline fluid using a STREED system. FIG. 3A shows inlet line 302 where a saline feed stream may flow through saline feed channel 304 to line 306. A light intensity dependent flow controller 308 is shown connected or coupled to the inlet line 302. The saline feed channel 304 is shown coupled to a saline feed insulator 310 and a feed conductor 312. As shown in FIG. 3A, line 306 connects the saline feed channel 304 to a solar saline stream channel 314. A solar insulator 316 is shown positioned between the solar saline stream channel 314 and a solar energy source 318. A solar conductor 320 is shown positioned between the solar saline stream channel 314 and a first vapor absorber 322.

As shown in FIG. 3A, line 324 is shown connected to solar saline stream channel 314 and a saline stream channel 326. Fluid may be heated in the solar saline stream channel 314 by the solar energy source 318, and then flow through line 324 to the saline stream channel 326. The saline stream channel 326 is configured with an interior porous surface (not shown) through which fluid may traverse from the saline stream channel 326 to a coupled nanoparticle mesh 328. A first vapor 330 may traverse through the nanoparticle mesh 328 and through a first gap 332 to the first vapor absorber 322. The first vapor absorber 322 is shown connected to line 334, though which fluid collected in the first vapor absorber 322 may traverse.

The saline feed insulator 310 may be connected on an opposite side of the saline stream channel 326 from the nanoparticle mesh 328. Thus, in the embodiment shown, the saline feed insulator 310 may be adjacent to and layered between the saline feed channel 304 and the saline stream channel 326 in order to insulate the heated saline stream channel 326 from the saline feed channel 304 (which may have relatively cooler saline feed flowing therethrough).

In FIG. 3A, line 336 is shown fluidly connected between the saline stream channel 326 and a second saline stream channel 338. The second saline stream channel 338 has an interior porous surface (not shown) through which a second vapor 340 may traverse to a second vapor absorber 342 through a second gap 344. The second vapor absorber 342 is shown as fluidly connected to line 346, though which fluid collected in the second vapor absorber 342 may traverse. Line 348 is shown as fluidly connected to the second saline stream channel 338, through which a fluid may exit the second saline stream channel 338. A second insulator 350 may be attached to or positioned on an opposite side of the second saline stream channel 338 from the second gap 344.

In embodiments of the present disclosure, at least three product streams may be produced, (i) a first purified water stream, (ii) second purified water stream, and (iii) brine waste stream. The first purified water stream may be contained in a line out of a first vapor absorber, such as line 334 in FIG. 3A. The second purified water stream may be contained in a line out of a second vapor absorber, such as line 346 in FIG. 3A. The waste brine stream may traverse through a second saline stream channel to a line out of the system, such as line 348 in FIG. 3A.

In some embodiments of the present disclosure, ultrasonic transducers may be used to mitigate scaling. The ultrasonic transducers may be coupled to the inner surfaces of the channels configured to contain a saline stream (e.g., channels 304, 314, 326, and 338 shown in FIG. 3A). The ultrasonic transducers may provide for periodic scaling and fouling removal with minimal downtime.

According to embodiments of the present disclosure, a system including a STREED module may have a length and width each ranging between about 0.5 m to 2 m, and may have a thickness ranging from about 10 cm to 50 cm from a top layer (e.g., solar insulator 316 layer shown in FIG. 3A) to a bottom layer (e.g., second insulator 350 layer shown in FIG. 3A).

In embodiments of the present disclosure, a saline stream channel, such as the saline stream channel 326 in FIG. 3A, may include at least a portion of a porous wall, where the porous wall may be configured to prevent fluid from flowing through the pores while allowing vapor from the fluid to flow through the porous wall and flow through a gap, such as first gap 332 in FIG. 3A. In some embodiments of the present disclosure, broadband absorber nanoparticles ("nanoparticles") may be coupled to the inner surface of the saline stream channel. The nanoparticles may be applied to at least the porous wall portion of the channel. The nanoparticles may be applied to the inner surface of the saline stream channel by spray coating methods, where the nanoparticles may bond with the porous wall portion of the channel. In some embodiments, the nanoparticles may form a coating on the portion of the inner surface of the saline stream channel proximate to the gap separating the saline stream channel and a vapor absorber. The combination of the porous material of the saline stream channel and the nanoparticles may be characterized as a nanoparticle mesh membrane in some embodiments of the present disclosure. In some embodiments of the present disclosure, the porous wall portion of the channel may be characterized as a mesh, where the mesh may bond with and sustain the nanoparticles during operation of the STREED. In some embodiments of the present disclosure, the porous wall portion, or mesh, may be flexible. The pores of the mesh may be large enough to allow water to pass through.

The nanoparticles may include broadband, light-absorbing carbon black particles. The nanoparticles are useful to localize solar energy, minimize heat loss, and minimize or eliminate the need for external power to vaporize and separate water from a saline stream. Heat localization within the nanoparticle coating, or layer, may induce an increase in temperature at the inner surface of the channel and the saline contained therein. In contrast to conventional membrane-based desalination systems, the nanoparticles of embodiments of the present disclosure may mitigate scaling and fouling.

In embodiments of the present disclosure, the insulator layers such as solar insulator 316, saline feed insulator 310, and second insulator 350, may be composed of thermally insulating materials, such as fiberglass, cellulose, aerogels, or polymers such as polyurethane, polystyrene, or a combination of thermally insulating materials. In some embodiments, infrared mirrors or selective emitters may be used as the solar insulator to minimize radiation losses. The insulator layers may also be composed of transparent material.

In embodiments of the present disclosure, the conductors and conducting layers such as solar conductor 320 and feed conductor 312, may be made of thermally conducting materials, such as metals, such as copper or aluminum.

In embodiments of the present disclosure, the vapor absorbers such as first vapor absorber 322 and second vapor absorber 342, may be made of any material that can condense water and has an appropriate thermal conductivity, such as a hydrogel.

Figure 3B:
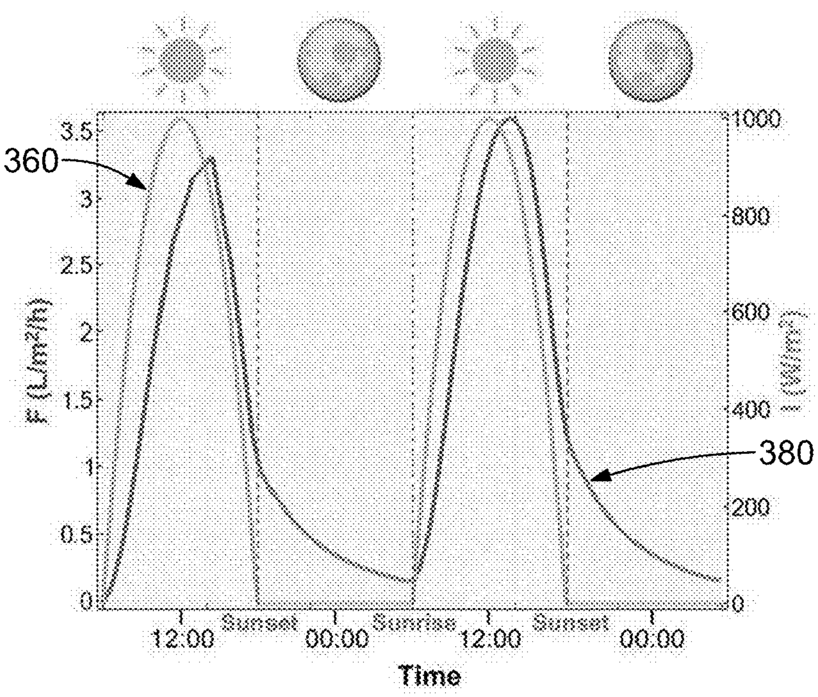
FIG. 3B shows the flux rate for a STREED module in accordance with one or more embodiments and a realistic time dependent illumination over a 48-hour operation.

Further, according to embodiments of the present disclosure, STREED systems may include REX mechanisms. REX may provide embodiments with the required thermal energy to support continuous systems, such as a continuous desalination system, without additional energy sources. REX may store energy and drive operations for extended periods of time. The stored energy of REX may be useful in continuing operations during periods of time where solar energy input is unavailable, such as night-time and days of heavy cloud-cover. As shown in FIG. 3B, integration of REX may enable embodiments of the present disclosure, such as a STREED module, to operate after solar energy is unavailable.

Figure 3C:
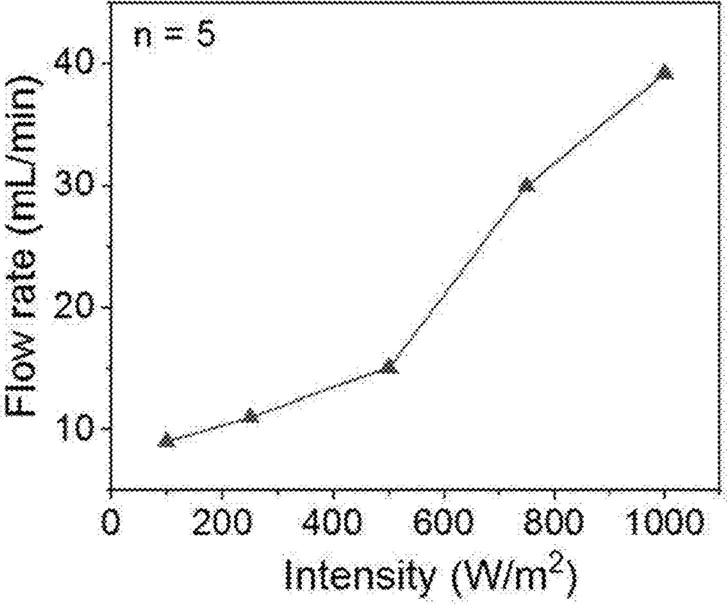
FIG. 3C shows an example of an optimized feed flow rate as a function of the light intensity input for an embodiment of the present disclosure.

REX may be implemented in embodiments of the present disclosure (e.g., in NESMD and STREED systems) by tuning a saline feed flow rate with a solar light intensity input. Thus, continuous operation may be ensured by optimization of the input conditions. FIG. 3C shows an example of an optimized feed flow rate as a function of the light intensity input for an embodiment of the present disclosure. More specifically, FIG. 3C shows the data from a STREED embodiment of the present disclosure, where the feed flow rate increases as the light intensity increases. The flux rate of a STREED module over a 48-hour operation may continue even in the absence of the sun, or solar energy, at night.

In embodiments of the present disclosure, solar energy may be utilized to heat saline water. The solar energy may provide the required heat of vaporization to separate the water from the dissolved solids in the saline water without additional energy sources. This type of solar-driven desalination via distillation may be useful in desalinating feed water with a high salinity, as compared to conventional membrane-based desalination processes.

In embodiments of the present disclosure, including embodiments using a STREED system or a NESMD system, or both, a saline feed may be heated by the heat from a purified water stream. For example, the saline feed may be heated by recycled heat from a heated purified water stream, where the heat may traverse through a conductor positioned between the saline feed channel and a vapor absorber layer containing the heated purified water stream (e.g., solar saline stream channel 314 in FIG. 3A). The heat conducted to the saline feed stream through the conductor may increase the temperature of the saline feed stream to create a heated saline stream.

In embodiments having a STREED system, a saline feed stream may enter a channel configured to receive solar energy from a solar insulator (e.g., solar saline stream channel 314 in FIG. 3A). The temperature of the saline feed stream in the channel may increase via solar energy radiated through a solar insulator to create a heated saline stream. The solar insulator may be, for example, a transparent insulating window with an emission-suppressing coating to minimize heat loss to the surrounding environment. The heated saline stream may also be in contact with a conductor, such as solar conductor 320 in FIG. 3A. The conductor may be a transparent conducting layer configured with grooves to increase the surface area in contact with the heated saline stream, thus increasing heat transfer efficiency. The conductor may also be coupled to a vapor absorber layer, such as first vapor absorber 322. The vapor absorber may condense a water vapor. The condensed water vapor, or purified water stream, may flow in a direction counter to the flow of the saline stream. The counter-current flows of the saline stream and the condensed water vapor may provide for an efficient transfer of enthalpy of vaporization to the incoming saline stream through the conductor, thus facilitating efficient heat recovery from the outgoing condensed water vapor in the vapor absorber and outgoing line (e.g., line 334 in FIG. 3A).

In embodiments of the present disclosure, a heated saline stream may enter a channel coupled with a photothermal nanoparticle mesh. The heated saline stream may also be insulated on at least one side of the stream by an insulator (e.g., saline feed insulator 310 in FIG. 3A). Solar energy may radiate through a solar insulator and reach the photothermal nanoparticle mesh. The solar energy may irradiate the photothermal nanoparticle mesh, and the irradiated nanoparticles may heat the adjacently flowing fluid through light localization. When the localized heat in the nanoparticles heat the saline stream in contact with the photothermal nanoparticle mesh, the water contained therein may evaporate through the mesh. The water vapor may then traverse a gap (e.g., first gap 332 in FIG. 3A) where it may condense as purified water in a vapor absorber. The condensed purified water may traverse through the vapor absorber to an outlet line, such as line 334 in FIG. 3A. The purified water stream may transfer heat into the incoming saline feed via the solar conductor, as previously described.

In some embodiments of the present disclosure, after the saline stream passes the nanoparticle mesh layer, the fluid may flow through a second saline stream channel, such as second saline stream channel 338 in FIG. 3A. Additional stored heat in the saline stream contained in the second saline stream channel may create additional water vapor. The additional water vapor from the second saline stream channel may pass through a porous portion of the second saline stream channel. The additional water vapor may then traverse through a second gap, such as second gap 344 in FIG. 3A. The additional water vapor may be captured by a second vapor absorber, such as second vapor absorber 342 in FIG. 3A. The captured water vapor may condense into a second purified water stream and traverse through an outlet line, such as line 346 in FIG. 3A. The second condensed water stream in the second vapor absorber may conduct heat to the saline feed channel via a conductor coupled to the second water vapor and the saline feed channel. The remaining fluid in the second saline stream channel may traverse through an outlet line, such as line 348 in FIG. 3A. The remaining fluid may be a brine waste stream wherein the saline concentration is greater than the saline concentration in the saline feed stream. The remaining fluid may also contain heat energy that may be used in subsequent systems coupled in series.

Embodiments of the present disclosure may include PTFS systems (e.g., STREED systems and/or NESMD systems) having a light intensity dependent flow controller coupled to a saline feed line wherein the flow contained in the saline feed line may be controlled. The input flow rate may be controlled as a function of input light intensity, thus providing an embodiment to reach REX condition. A system in REX condition may store energy and operate for extended periods of time, particularly when solar energy is unavailable. REX may be implemented by tuning the feed flow rate with solar intensity to continuously operate at optimized conditions (see FIG. 3B).

Embodiments of the present disclosure may include PTFS systems (e.g., STREED systems and/or NESMD systems) assembled in a stand-alone, modular arrangement. The modular arrangement of embodiments of the present disclosure may provide for the scalability of multiple modules connected or coupled together in a single operation. In this way, it is envisioned that the use of at least two modules in a single operation may meet small and large capacity requirements of the overall operation, depending on the number of modules used in the operation.

Figure 3D:
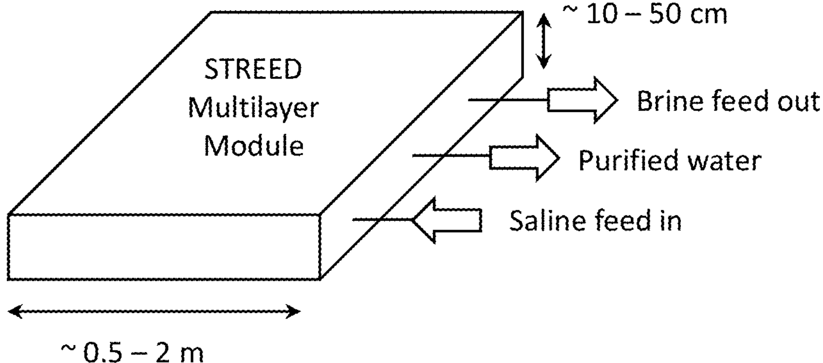
FIG. 3D shows an example of a STREED module in accordance with one or more embodiments.

For example, FIG. 3D shows an example of a single STREED module, which may have a width and length ranging, for example, between about 0.5 and 2 meters and a thickness ranging, for example, between about 10 and 50 cm. Each STREED module may include at least one input stream ("saline feed in") and at least two output streams ("brine feed out" and "purified water").

Figure 3E:
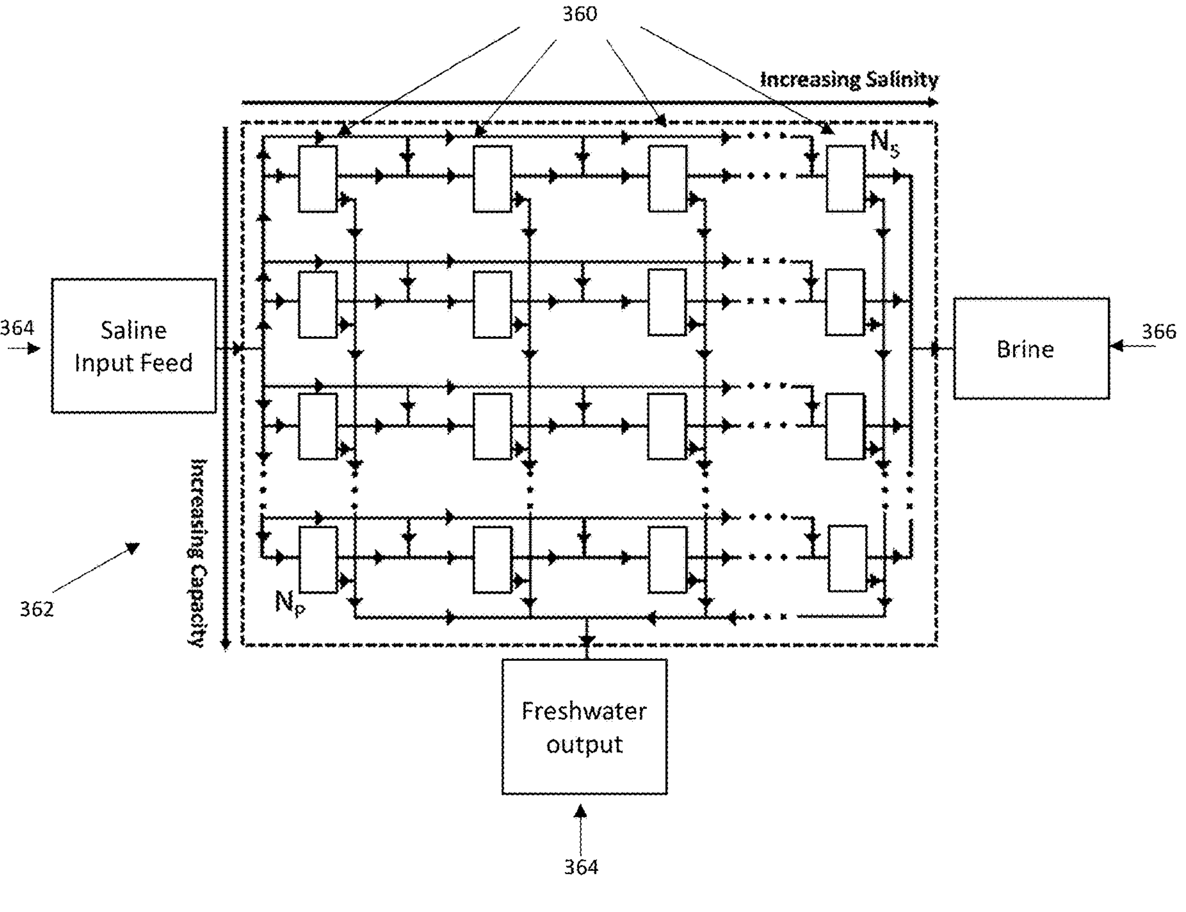
FIG. 3E shows an example of STREED modules in a series and parallel configuration in accordance with one or more embodiments.

Referring to FIG. 3E, FIG. 3E shows a schematic of several STREED modules 360 (represented by black rectangles) combined in a STREED operation 362. FIG. 3E shows a saline input feed 364, a brine output 366, and a freshwater output 368. FIG. 3E shows STREED modules connected in series (as shown by the rows of connected modules in FIG. 3E), where the brine exit fluid may be used as the saline feed fluid in the subsequent module, and the final brine output 366 may be combined. FIG. 3E also shows STREED modules connected in parallel (as shown by the columns of modules in FIG. 3E), where each system may operate independently of the other modules in the same column and the freshwater output 364 may be combined. As shown in FIG. 3E, both parallel and series connections between the multiple STREED modules, such as STREED modules 360, may increase capacity ("y-axis"). STREED modules connected in series may also improve the control over the salinity ("x-axis") of the output stream as the output of one module may be the input of the subsequent modules (see modules 360 in the same row in FIG. 3E). In some embodiments, and as shown in FIG. 3E, a system may include STREED modules connected in series (FIG. 3E rows) and in parallel (FIG. 3E columns). For example, a system according to one or more embodiments may have $N_s$=63 where $N_s$ is the number of modules connected in series in each row of modules, and $N_p$=47 where $N_p$ is the number of modules connected in parallel in each column of modules, to provide a total of 2,961 modules ($N_p$*$N_s$). This system of 2,961 modules connected in series and parallel may produce 100 $m^3$/day of freshwater and 20 $m^3$/day of brine with a light intensity of 6 $KWh/m^2$/day and a saline input feed of 120 $m^3$/day.

In some embodiments of the present disclosure, the use of multiple modules, or units, also provides for improved heat efficiency in an overall operation. Multiple layered PTFS modules, such as the STREED modules or NESMD modules, may be stacked to increase heat recovery from an exiting saline stream. The brine waste stream from an upstream module may be fed into a downstream, or underlying module, where the brine waste stream may be used as a saline feed for the underlying module. The same procedure may be repeated with subsequent modules, wherein each brine waste stream is used as the feed stream for the next module connected in the system, thus minimizing heat loss to the environment. In some embodiments, the feed flowing into the underlying modules will absorb the heat of vaporization from the condensed vapor through the (feed) conductor and continue as described.

Module arrangement of embodiments of the present disclosure may further support thermal energy storage. Energy efficiency may increase with each additional module, as the overall thermal energy is continuously recirculated within the connected modules. Thermal energy is transferred to subsequent downstream modules.

Figure 3F:
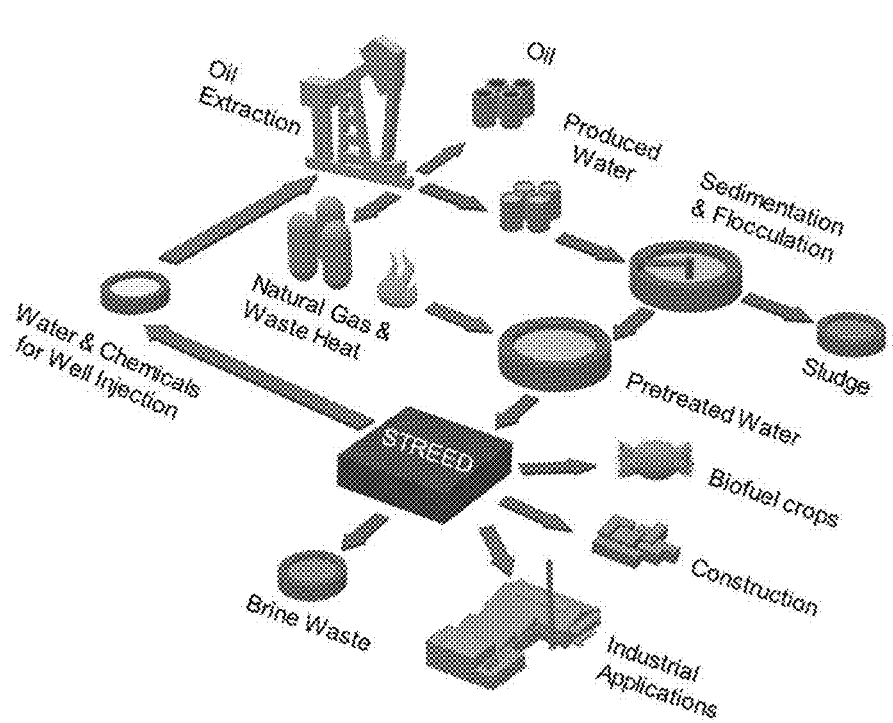
FIG. 3F shows a STREED system in accordance with one or more embodiments used in an oilfield operation.

The scalable characteristic of embodiments of the present disclosure may provide for desalination of large operations, such as solar desalination farms and oil and gas wastewater treatment, as well as small operations, such as household or remote community fresh water supplies. Several modules may be connected in series or in parallel to achieve a required overall system capacity. A series configuration may also provide control of the salinity of the output brine (brine waste stream) as the brine waste stream is used as the incoming saline feed stream for the subsequent module. An example of the use of a STREED system is shown in FIG. 3F, where the STREED system may include multiple STREED modules connected together in series and/or in parallel. FIG. 3F shows a STREED system as used in an oilfield operation where the water produced in oil extraction is preheated and fed into a STREED system. The water produced by the desalination may be used for reinjection or other potential uses depending on the quality and location of the operations. Overall, the STREED embodiment may reduce costs by recycling part of the produced water, reduce the amount of brine waste, and increase profits through sales of the purified water.

Embodiments of the present disclosure may be integrated into a variety of applications, including brackish water purification for households, commercial, and industrial operations. The availability of artificial solar-light sources, such as high intensity light sources (LEDs and LASERS) and access to natural light, opens access to embodiments of the present disclosure from micro-nanoscale photothermal devices to large scale thermal equipment. Examples of applications that may use embodiments of the present disclosure are seawater desalination, waste water from enhanced oil recovery operations, brine concentration, and applications with zero liquid discharge (ZLD) systems used in wastewater treatment processes.

STREED systems disclosed herein exemplify fundamental aspects of nanophotonically driven solar membrane desalination of the present disclosure. For example, STREED has shown improvements to system performance by incorporating optimal light-focusing elements and use of REX to provide fresh water production of about ~20 L/m$^2$/day. Validated theoretical modeling of STREED modules predicts fresh water production rates of ~30 L/m$^2$ during a typical day with sunlight delivering a total of ~8 kWh/m$^2$ over 24 hours, depending on, for example, the size of the STREED system and initial salt concentration of the inlet feed. This performance corresponds to a Specific Energy Consumption (SEC) of ~270 kWh/m$^3$ or ~3.7 L/kWh. Under the same conditions, an evaporation system with 100% efficiency can achieve about 12 L/m$^2$/day without utilizing the resonant energy storage principle of the present disclosure.

STREED modules may provide for desalination and thermal energy storage. Under direct sunlight illumination $I_{sun}$, the maximum evaporation flux rate $F_{sun}$ per unit area for a thermal desalination system without heat recovery may be estimated as $F_{sun}=I_{sun}/H_{vap}\cong 1.5$ L/(m$^2$h) assuming a vaporization enthalpy $H_{vap}$=2400 kJ/kg and $I_{sun}$=1 kW/m$^2$. While $H_{vap}$ is in reality temperature dependent, this number represents a useful baseline for evaluating a system performance. Considering a typical daily sunlight exposure (e.g. 360, FIG. 3B), an ideal distillation system (100% thermal efficiency) without heat recovery could achieve a maximum total produced daily fresh water, $$w=\int_0^{24\ h} I_{sun}(t)/H_{vap}\cong 12\ \mathrm{L/(m^2day)}$$

under direct illumination only. Embodiments including one or more STREED modules may achieve up to W=30 L/(m$^2$ day), a 250% increase. Additionally, at sunset the flux rate may decrease more slowly until the following sunrise, due to incorporating the REX principle in system design. This aspect allows STREED modules to be used as both desalination and thermal energy storage devices.

Figure 3G:
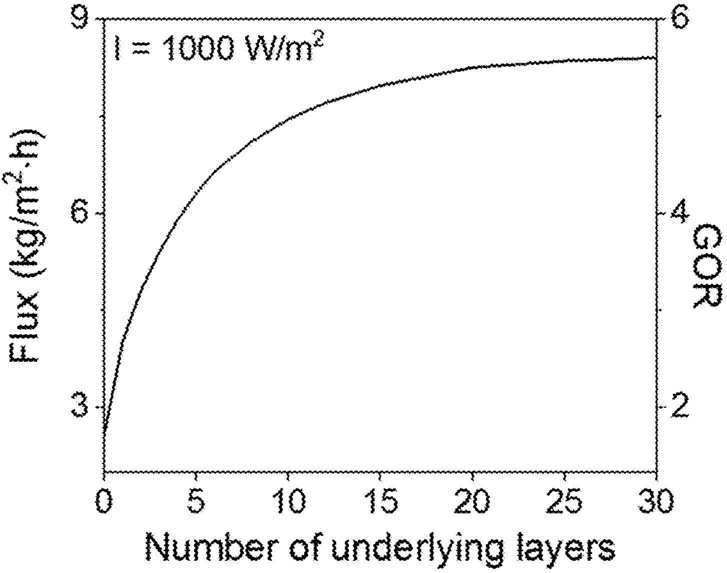
FIG. 3G shows an example of a stationary STREED performance layer dependance on a flux and gain output ratio (GOR).

FIG. 3B shows the flux rate (left axis) for a STREED module (380) and data for the illumination (right axis) from a realistic time dependent illumination (360) over a 48-hour operation. FIG. 3C shows an example of an optimized input flow rate as a function of light intensity for a STREED module. FIG. 3G shows an example of a stationary STREED performance layer dependance on a flux and gain output ratio (GOR). In FIGS. 3B, 3C, and 3G, the data assumes air background, with each layer in the STREED module being 0.5 m long and 10 cm wide. The utilized materials and corresponding thicknesses used in the STREED module for FIGS. 3B, 3C, and 3G include the following: 1 cm thick acrylic glass insulators, 0.5 mm ITO conductors, 5 mm air gap evaporation layer, 100 μm nanoparticulate layer, and 2 mm feed water channels. Suppressed emissivity (¿=0.1) and convection ($h_c$=0.5 W/(m$^2$K)) are considered in the data for the STREED module.

Embodiments of the present disclosure may be used to improve the performance of a thermochemical reactor. For example, a thermofluidic system according to embodiments of the present disclosure may be used as a thermochemical reactor where at least two counter-flowing liquid streams include at least one chemical precursor to a chemical reaction in a resonant thermal oscillator. In some embodiments, a catalyst material may be provided along at least one surface in the system (e.g., on a heat absorbing layer), which may be used to catalyze one or more reactions in the system. Heat exchange in a thermofluidic system acting as a thermochemical reactor according to embodiments of the present disclosure may be used to alter the rate of chemical reactions in the thermofluidic system. For example, by controlling the flow rates of one or more fluid streams flowing through the system, the heat exchange may be optimized to provide a selected temperature condition of the reaction, thereby controlling the rate of the chemical reaction.

Embodiments of the present disclosure may provide cost-effective desalination of a water supply with minimal maintenance requirements. Embodiments of the present disclosure may also provide for fresh water supply for remote locations. For example, the STREED modules may integrate solar absorption and water desalination without solar concentrators, while capable of handling a wide range of salinities.

Embodiments of the present disclosure may also reduce costs of waste water disposal, transportation emissions, and wastewater injection environmental risks by reducing water disposal volumes.

Experimental Setup

An experiment was performed using a 10.2 cm×20.3 cm NESMD module with a 10.2 cm×40.6 cm inline HX with 2 mm water channels on both sides. To study the effect of heat exchange in reaching the resonance condition of the system, the variation of external parameters is minimized, such as incident light intensity and temperature. The NESMD was thus illuminated with an LED lamp (FAISHILAN 200W LED Flood Light, 1000W Halogen Equivalent Outdoor Work Lights, IP66 Waterproof with US-3 Plug & Switch, 20000 Lm, 6500K) at a distance resulting in an intensity of ~475 W/m$^2$. In some embodiments, the feed and distillate input temperatures were maintained equal and constant at 25° C. with a water bath (SoCal Biomed). This water bath temperature is referred to as the ambient temperature. The external temperature was ~20° C. In all theoretical modeling, the input ambient temperature for feed and distillate was set to 25° C. and external sink temperature was set to 20° C. Variable velocity peristaltic pumps (Cole-Parmer Peristaltic Pump; 0.4 to 85 mL/min, 12 VDC/115 VAC UX-73160-32) were used to circulate 1 weight % saline feed and deionized distillate at the top and bottom of the membrane respectively. The light absorbing membrane mounted in the NESMD unit was fabricated by spray coating polyvinylidene difluoride (PVDF) membranes with a light absorbing layer of carbon black (Cabot Corporation) nanoparticles. A 10.2 cm×40.6 cm heat exchanger included ~500 μm thick aluminum sheet for the heat exchange. The experimental setup utilizes input feed water at a relatively low 1% (10,000 TDS) salinity. However, in some embodiments, large solute contents in the feed channel can have a sensitive impact on the flow rate optimization and should be taken into account to maximize heat recovery.

Thermal Desalination Oscillator Performance

Turning to FIG. 2C, FIG. 2C shows calculated flux through 10.2 cm×20.3 cm NESMD with (260) and without (280) 10.2 cm×40.6 cm inline HX for varying distillate flow at fixed feed flow of 6.5 mL/min. The uncertainty is due to the variation (2-10 μm) in CB thickness. The measured experimental flux with HX for the coupled system is shown in diamonds and without HX is shown with triangles. In some embodiments, maintaining the feed flow ($Q_F$) constant at 6.5 mL/min, a clear resonant behavior can be observed by varying the distillate flow achieving a maximum purified water flux of ~1.1 kg/(m$^2$h) as shown in FIG. 2C. The region with HX 260 corresponds to the simulated purified water flux for these experimental conditions, as shown in further details in FIGS. 4-6. The width of the simulation curve reflects the variations in the penetration depth of the CB coating (2-10 microns). The calculated flux without HX 280 for the bare NESMD system is also shown in FIG. 2C.

Figure 7:
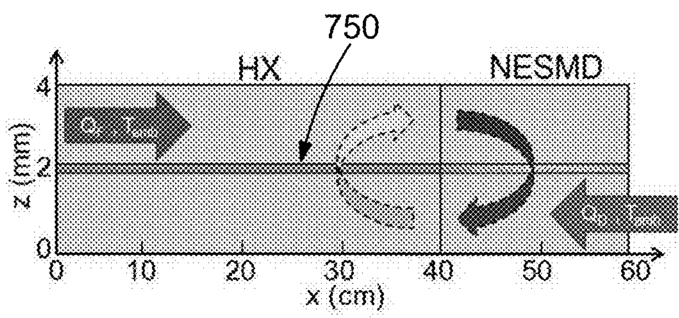
FIG. 7 shows a two-dimensional schematic of a TDO system in accordance with one or more embodiments.

Turning to FIG. 2D, FIG. 2D shows calculated power transferred from distillate to feed for the device in the HX region in FIG. 2C. In the coupled system, when the distillate flow is much faster ($Q_D$>>$Q_F$) or much slower ($Q_D$<<$Q_F$) than the feed, the distillate flux is significantly lower than the flux at the resonant condition. In some embodiments, the calculated power transferred from distillate to feed peaks at matched feed and distillate velocities. FIG. 7 shows a two-dimensional schematic of the TDO system in which water is represented by the background area spanning x=0-60 cm, HX by 750, and the light absorbing membrane shown as the bar with backslashes.

Figure 8:
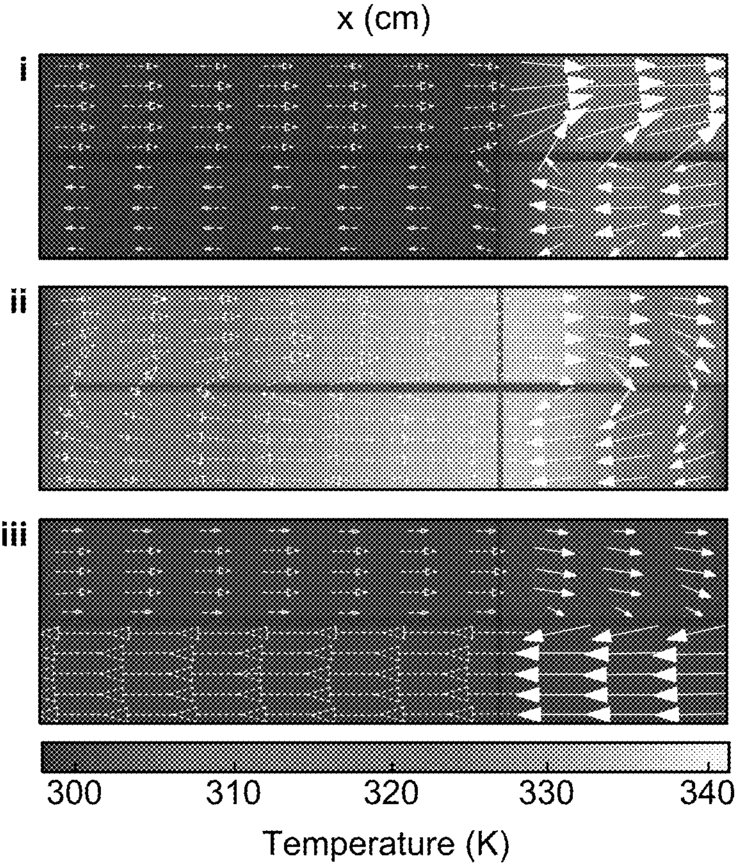
FIG. 8 shows total heat flux vector field for a system in accordance with one or more embodiments.

FIG. 8 shows total heat flux vector field (solid arrows: NESMD and dashed arrows: HX) in the TDO system at fixed feed flow of 6.5 mL/min and distillate flow of (i) 1 mL/min ($Q_D$<<$Q_F$), (ii) 7.4 mL/min ($Q_D$~$Q_F$), and (iii) 100 mL/min ($Q_D$>>$Q_F$). The three regimes yield very different heat fluxes and temperature distributions. A well-defined circular heat flux appears in FIG. 8 (ii) when $Q_D$~$Q_F$, the resonant condition. A more detailed analysis is shown in FIGS. 9A-9F.

Turning to FIGS. 9A-9F, FIG. 9A-9F show temperature and flux analysis of NESMD with and without HX in accordance with one or more embodiments. FIG. 9A shows temperature difference along the length across the metal in 10.2 cm×40.6 cm inline HX and 10.2 cm×20.3 cm membrane in NESMD given by subtracting distillate temperature from the feed temperature (solid line). For the case without HX (dashed line), the metal in HX is replaced by an insulator with vanishing thermal conductivity (~10-9 W/(m·K)). The plots are shown in region of $Q_D$ (1 mL/min)<<$Q_F$ (6.5 mL/min). FIG. 9B shows the purified water flux through the membrane in NESMD with (solid lines) and without HX (dashed line) for $Q_D$ (1 mL/min)<<$Q_F$ (6.5 mL/min). FIG. 9C shows the temperature difference with (solid lines) and without HX (dashed lines) for $Q_D$ (7.4 cm)~$Q_F$ (6.5 mL/min). FIG. 9D shows the flux through the membrane with (solid lines) and without (dashed lines) HX for $Q_D$ (7.4 cm)~$Q_F$ (6.5 mL/min). FIG. 9E shows the temperature difference with (solid lines) and without HX (dashed lines) for $Q_D$ (100 mL/min)>>$Q_F$ (6.5 mL/min). FIG. 9F shows the flux through the membrane with (solid lines) and without (dashed lines) HX for $Q_D$ (100 mL/min)>>$Q_F$ (6.5 mL/min).

In some embodiments, for $Q_D$<<$Q_F$ (FIGS. 8 (i) and 9A-9F), the feed receives heat from the membrane but quickly loses it through its outlet. The maximum temperature difference occurs at the feed outlet, where the incoming distillate temperature is close to 25° C. In the rest of the device, the slow distillate receives heat from the counter-flowing feed, resulting in a slightly negative temperature difference, as shown in FIG. 9A. A negative ΔT(x) results in 'back evaporation', i.e., evaporation from the distillate to the feed, as shown in FIG. 9B. This may explain why the solid energy flux arrows in the NESMD region in FIG. 8 (i) point from distillate to feed. For $Q_D$~$Q_F$, the feed first increases its temperature along x, absorbing heat from the distillate through conduction. In the membrane region with positive ΔT(x), heat is transferred to the distillate through water evaporation, as shown in FIGS. 9C and 9D.

The hot distillate exiting the membrane region exchanges heat with the feed and its temperature is reduced. This process is maximized as the heat starts circulating in the system, as shown by the flux arrows in FIG. 8 (ii). In some embodiments, heat is cycled back and forth between the feed and distillate and this resonant effect is the origin of the dramatically increased water flux. For $Q_D$>>$Q_F$, the slower feed receives more heat from the light absorbing layer. The faster distillate reduces the interaction time between feed and distillate, maintaining an overall positive temperature gradient across the membrane, as shown in FIGS. 9E and 9F. This results in heat flow from feed to distillate in the form of purified water flux, as shown in FIG. 8 (iii). While the distillate collects heat through condensation, the low interaction time limits heat exchange and the heat is lost as the distillate exits the HX (FIG. 8 (iii), dashed arrows).

In some embodiments, when flow rates are matched (resonance condition) the energy stored and its decay time are maximized due to overall loss minimization, a hallmark of oscillating systems at resonance. This effect is due to the heat fluxes that alternate (oscillate) between feed and distillate, as shown in FIG. 8 (ii). FIG. 9A-9F shows in detail how it is possible to analytically calculate, for a simplified but fundamentally equivalent case, the energy decay time, highlighting the similarities with more common time-driven harmonic oscillators.

Dynamic Thermal Recovery with System Size, Losses and Intensity

Figure 10C:
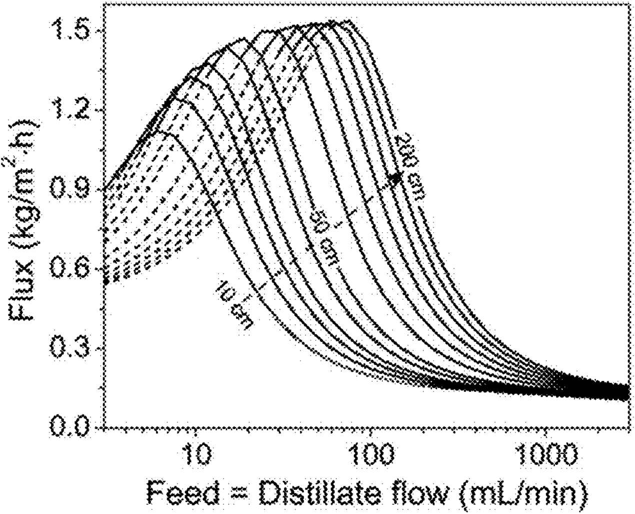
FIG. 10C shows distillate flux from a NESMD with a HX module of the same size, for equal feed and distillate flow rates.

In some embodiments, the performance of NESMD and/or STREED systems has been predicted to improve with increasing module size. For example, FIGS. 10A-10F show data related to an example of purified water production enhancement for a TDO system with size scale up. FIG. 10A shows a schematic of the TDO system showing different heat loss mechanisms in the two parts of the coupled system with equal membrane and conductor lengths. FIG. 10B shows conduction, convection and radiation losses in the polycarbonate window layer and water channels in a 10.3 cm×50 cm NESMD module connected to a 10.3 cm×50 cm HX module normalized to input solar power at 20° C. under 1 Sun illumination (1 kW/$m^2$). The normalized distillate flux is shown in 1010 of FIG. 10B. The relevant loss mechanisms are convection and conduction through the feed and distillate water flows, conduction through the polycarbonate (PC) window to the environment, and convection/radiation from the top PC surface. The relative weights of each loss channel normalized to input solar power as a function of flow are shown in FIG. 10B.

Figure 11:
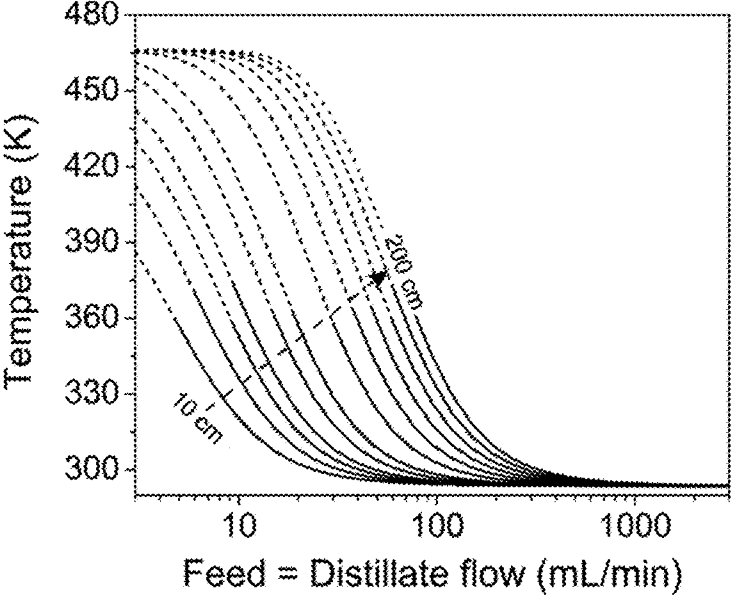
FIG. 11 shows the maximum temperature in TDO systems with varying resonant feed and distillate flows for increasing NESMD size with equal length HX module.

FIG. 10C shows distillate flux from a 10.3 cm wide NESMD module with length ranging from 10 cm to 200 cm with a heat exchanger module of the same size, for equal feed and distillate flow rates. The dependence of flux rates on the feed and distillate flows is shown in FIG. 10C. Dashed lines indicate flux when maximum temperature in the system is above the boiling point of water. The dashed curves correspond to configurations where the maximum temperature in the system ($T_{max}$) is higher than the boiling point of water ($T_B$), as shown in FIG. 11. FIG. 11 shows the maximum temperature in the TDO system with varying resonant feed and distillate flows for increasing NESMD module size from 10 cm to 200 cm with equal length of underlying HX layer. Configurations exhibiting temperatures where maximum temperature in the system ($T_{max}$) is higher than the boiling point of water ($T_B$) would not be operational, but it is informative to include them here since they provide context for understanding system optimization. The two main features observed in FIG. 10C are: (i) each curve exhibits a peak in flux for a given pair of matched feed and distillate flows and (ii), the peak flux value increases with size up to a particular length (~50 cm) before saturation at ~1.5 kg/$m^2$h The flux rate increases from its low value at lower flow rates because all three loss mechanisms, conduction, convection and radiation, in PC are reduced as the feed flow rate is increased, as shown in FIG. 10C. This is illustrated in FIG. 10B, which shows the relative losses from the NESMD region normalized to the input heat source from absorbed sunlight. At higher flow rates, the dominant loss is convection, mostly by the feed and distillate themselves. The optimal trade-off between external losses and heat recirculation occurs for a flow of ~20 mL/min and module length of ~50 cm, corresponding to a maximum fresh water flux rate of ~1.5 kg/($m^2$h) (FIG. 10C). Although the resonant oscillator behavior may be optimized with a sacrifice of scale-up, the possibility of maximizing fresh water flux in finite size modules may enable portable or modular systems with unprecedented performance and efficiency for distributed household settings, for example.

Figure 10D:
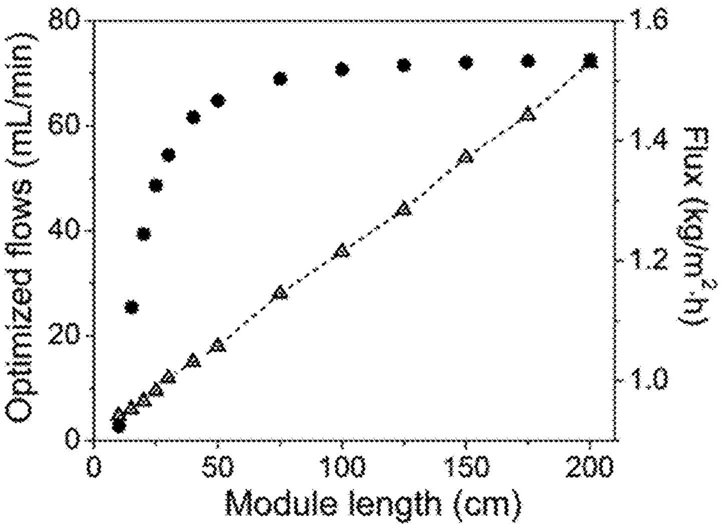
FIG. 10D shows optimal matched flow rate values and corresponding flux rate for different module sizes in accordance with one or more embodiments.
Figure 10E:
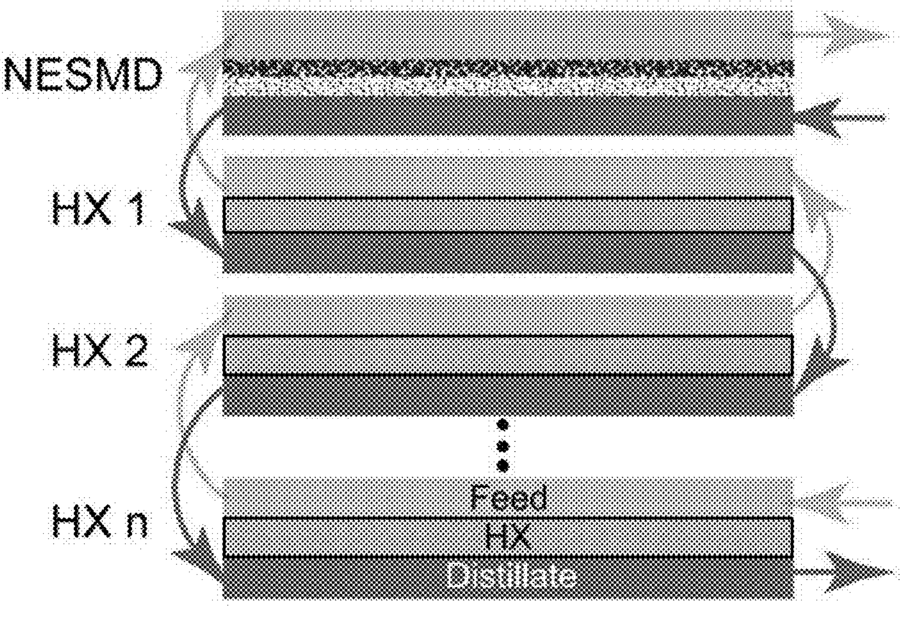
FIG. 10E shows a schematic of a stacked TDO system in accordance with one or more embodiments.
Figure 10F:
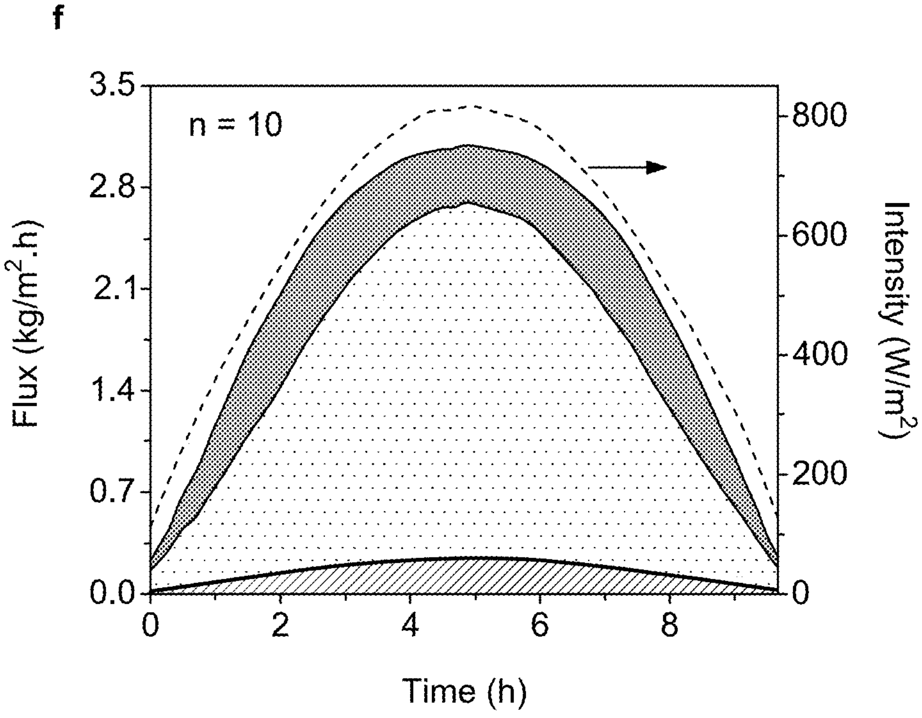
FIG. 10F shows comparison of flux production from NESMD with 10 HX layers during a 9-hour day with and without dynamic control.

FIG. 10D shows optimal matched flow rate values (left y-axis, dashes and triangles) and corresponding flux rate (right y-axis, circles) for different module sizes. FIG. 10E shows a schematic of a stacked TDO system. FIG. 10F shows comparison of flux production from NESMD with 10 HX layers during a 9-hour day with (dark area curve) and without (stippled area curve) dynamic control (left axis). Flux rates for the same system without HX layers with (solid line above forward slashed curve) and without (forward slashed curve) dynamic control. Solar intensity variation in dashed line (right axis).

The saturation value of the distillate flux rate as system size is increased depends on the balance between accumulated thermal energy, flow velocities, and external losses. More extended modules benefit from larger light-absorbing areas but require faster flows and longer heat exchangers. The optimal matched flows for different system sizes (FIG. 10C) are shown in FIG. 10D. Matched flows may increase with system size because additional convective cooling is used to avoid boiling and maintain an optimal temperature profile to maximize the flux.

Figure 12:
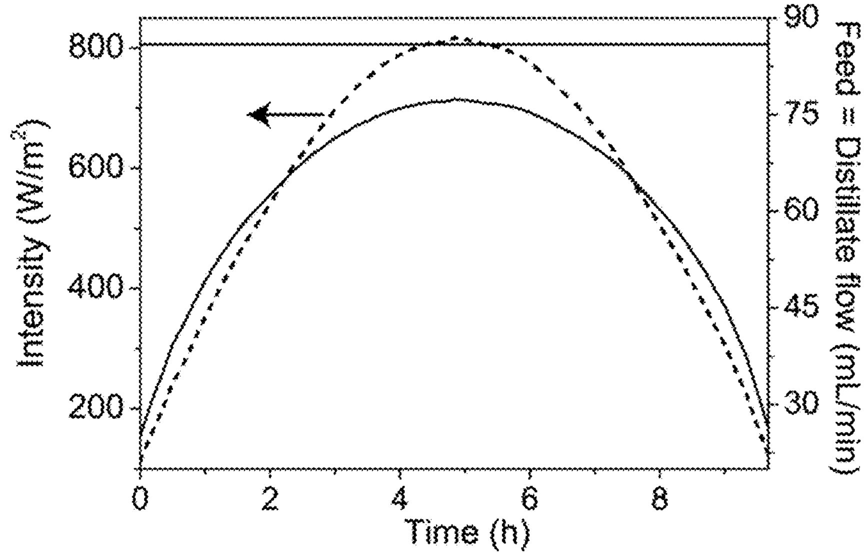
FIG. 12 shows static and dynamic resonance flows with intensity in accordance with one or more embodiments.

To maintain resonance and optimum distillate flux values, the flow rates may be tuned dynamically, throughout a typical day, as the solar radiation varies. A 50 cm insulated NESMD system is considered with limited radiation losses (with a low-emissivity coating of $\epsilon$=0.01 in the infrared). The idea is to configure an efficient, folded and stacked structure (FIG. 10E) with n HX layers. For example, for the typical solar intensities in Alamogordo, NM, (dashed curve in FIG. 10F), TDO performance using n=10 HX layers throughout the day is analyzed. For each input light intensity, the optimal pair of matched flows is selected, as shown in FIG. 12 to obtain optimal water production (dark area curve in FIG. 10F). In some embodiments, water flux production for dynamic flow change with intensity (dark area curve) is compared with the flux from the device with flow values optimized for 1 Sun (stippled area curve) in FIG. 10F. By integrating the flux rates over the entire day, dynamical flow rate control may yield a total output of 20.5 L/($m^2$ day) compared to 15.9 L/($m^2$ day) for fixed flow (stippled area curve), a net 29% gain. The yield from a NESMD system without HX would be much smaller: 1.7 L/($m^2$·day) with dynamic flow rate control, and 1.5 L/($m^2$ day) with no flow rate control. The specific energy consumption (i.e. the energy consumed to generate 1 cubic meter of purified water) of the dynamic heat recovery system is 276.8 kWh.

Figure 13A:
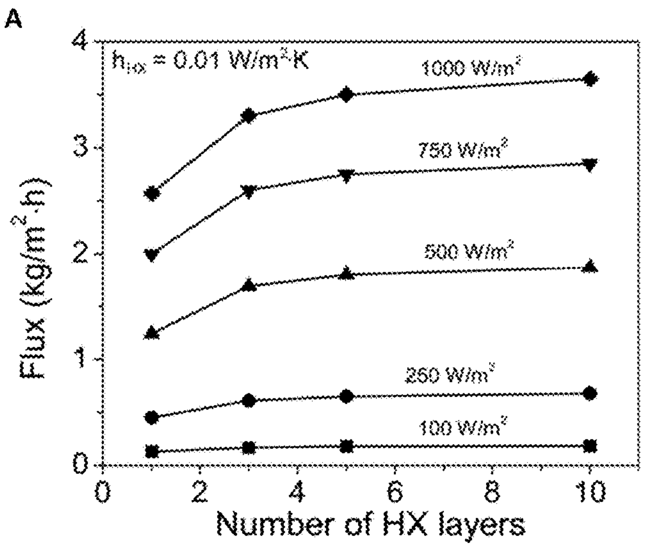
FIG. 13A shows flux rate dependence on n (from 1 to 10) for different incident intensities, I, (from 0.1 to 1 Sun).
Figure 13B:
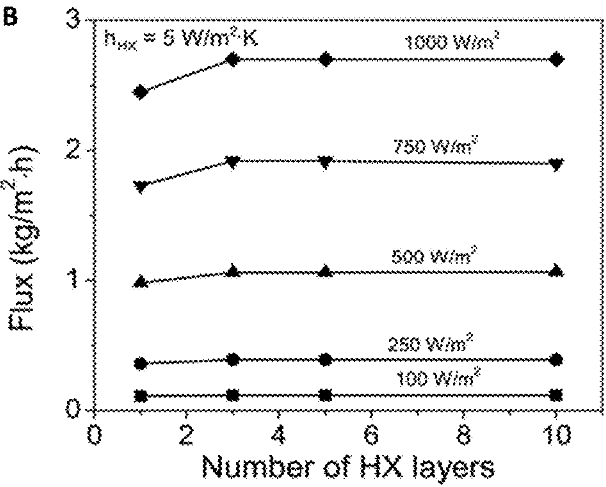
FIG. 13B shows flux rate dependence on n (from 1 to 10) for different incident intensities, I, (from 0.1 to 1 Sun).
Figure 13C:
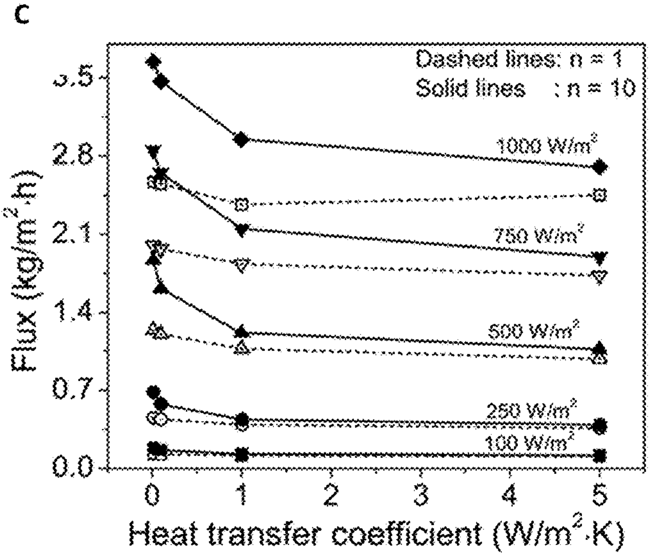
FIG. 13C shows flux rate dependence from layered TDO systems under varying solar intensity and with varying heat transfer coefficient.
Figure 14A:
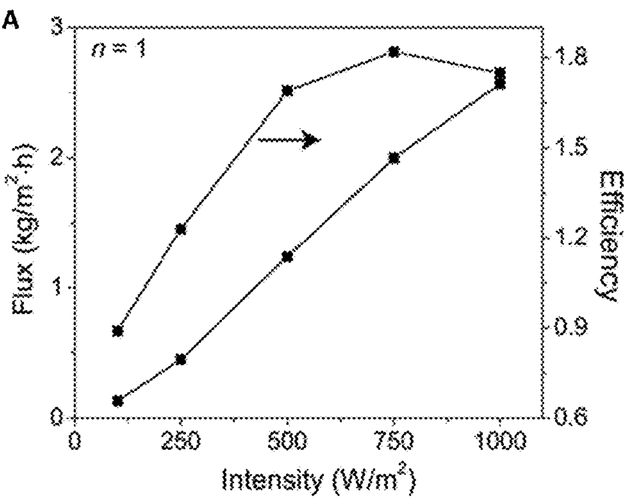
FIG. 14A shows flux rate and efficiency variation with illumination for a single layered TDO system.
Figure 14B:
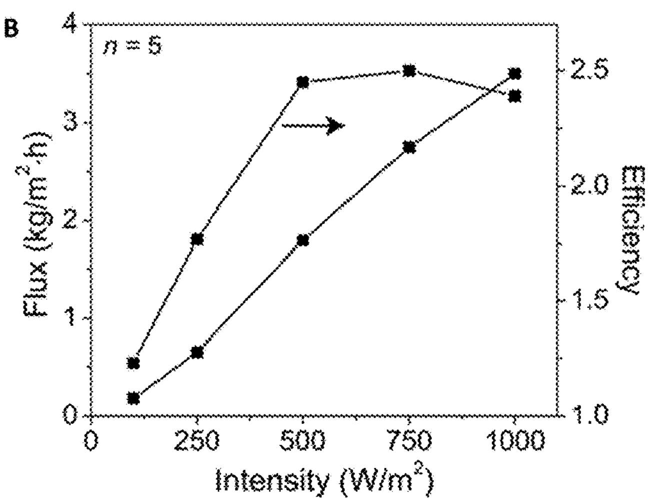
FIG. 14B shows flux rate and efficiency variation with illumination for a five-layered TDO system.
Figure 14C:
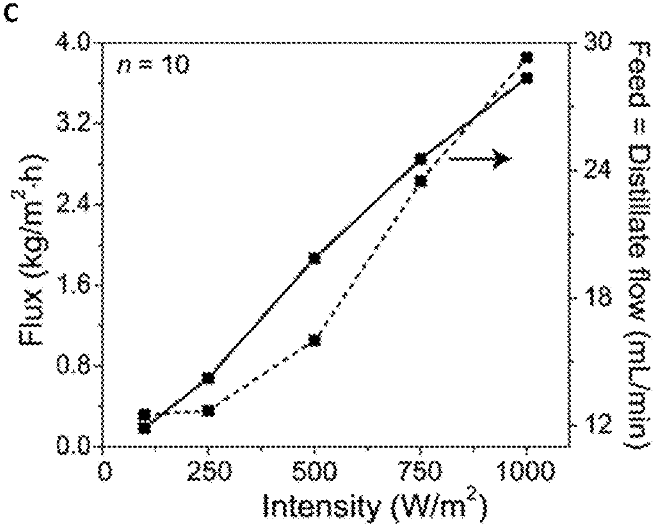
FIG. 14C shows flux rate and corresponding optimized feed and distillate flows variation with illumination intensity for a ten-layered TDO system.

The flux rate dependence on n (from 1 to 10) for different incident intensities, I, (from 0.1 to 1 Sun) is shown in FIGS. 13A-13B. FIG. 13C shows flux production from 1 (dashed lines) and 10 (solid lines) layered TDO system under varying solar intensity of 100 W/$m^2$, 250 W/$m^2$, 500 W/$m^2$, 750 W/$m^2$, and 1000 W/$m^2$ with heat transfer coefficient $h_{HX}$ varying from 0.01-5 W/$m^2$K. Flux rates increase with intensity for a given n because more power is harvested by the light absorbing nanoparticles. The flux also increases with increasing n because the distillate can transfer more heat back to the feed through the longer path length provided by more HX layers. To achieve larger fluxes at higher intensities, the matched flows need to increase in order to maintain the temperature below the boiling point of water. While higher intensities give larger fluxes, efficiency starts dropping above a certain intensity, as shown in FIGS. 14A-14C. The reason is subtle: for a given intensity, the typical flux vs. matched flows curve has a shape of the type shown in FIG. 10C, featuring a peak flow rate and lower performance for larger or smaller flows. However, the constraint $T_{max}<T_B$ pushes the $T_{max}$~$T_B$ edge away from the peak, toward higher matched flow regions. This translates into a sub-optimal efficiency.

Figure 15A:
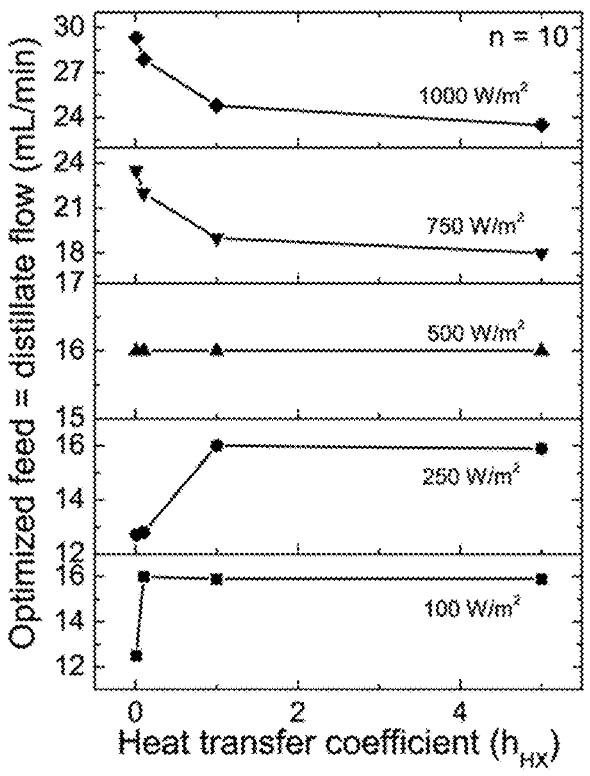
FIG. 15A shows the optimized feed and distillate flows in a system for varying intensities and losses.
Figure 15B:
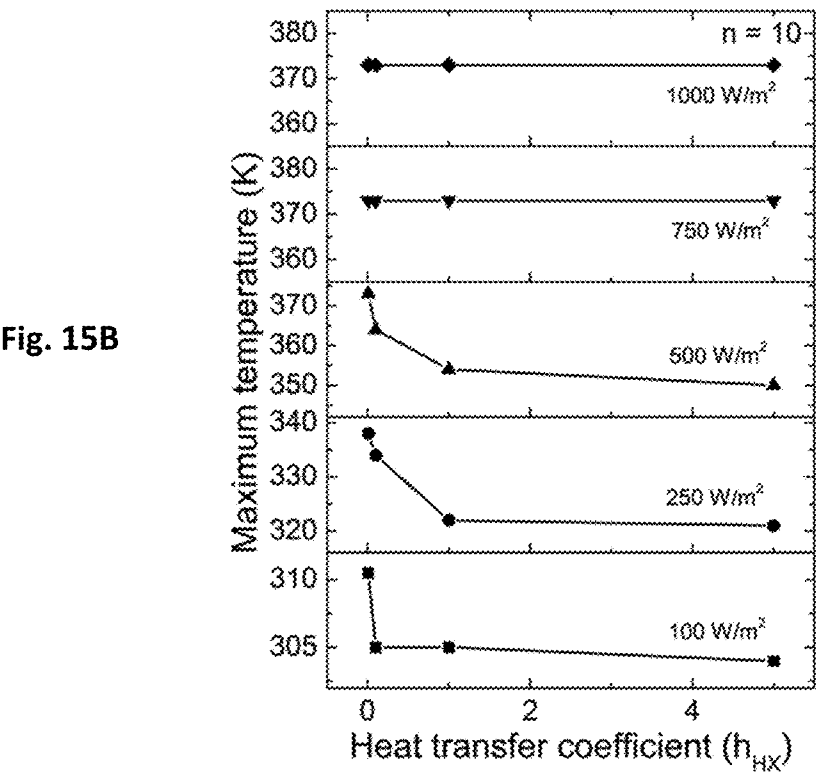
FIG. 15B shows corresponding temperatures for the system in FIG. 15A for varying intensities and losses.

In some embodiments, the optimal efficiency conditions also depend on losses. A small combined heat transfer coefficient $h_{HX}$=0.01 W/($m^2$K) was assumed since the HX module was not exposed to the environment and can be well insulated. In some embodiments, an analysis of the impact of HX losses is performed on the system performance. The dynamic flow rate control can also be applied to mitigate losses, as shown in FIGS. 15A-15B. FIG. 15A shows data for an optimized feed and distillate flows in a system may increase with increasing losses for lower intensities and reduce with increasing losses for higher intensities. FIG. 15B shows the corresponding temperatures for the same system for varying intensities and losses. In some embodiments, the real-time dynamic flow control may take into account the varying feed salinity and the decreasing/increasing feed/distillate flows (due to the transfer of evaporated water between the two channels) to ensure an even more accurate heat recovery optimization.

Theoretical Analysis of Heat Flux Dynamics Across Resonance

Turning to FIGS. 16A-16F, FIGS. 16A-16F show data from a resonant heat transfer (REX) concept in accordance with one or more embodiments. FIG. 16A shows two interacting channels of length L and thickness w. Two counter-current flows, $Q_F$ and $Q_D$, are separated by a heat conductor which also serves as planar heat source $I_s$ (W/$m^2$). The flows transport heat through advection along x and heat exchange along z through an effective heat transfer coefficient $h_{eff}$ (W/$m^2$/K) which accounts for both water and conductor thermal properties. The net heat transfers $I_{F\to D}$ and $I_{D\to F}$ are calculated in the regions [0–L/2] and [–L/2–0], respectively. The system is assumed thermally insulated. Heat exits the system through the outlets. Density and specific heat of the flows (water) are p and c respectively. The arrows 1602 represent the heat flows for near resonant condition.

FIG. 16B shows heat transfer enhancements (normalized to $I_s$) for $I_{F\to D}$ (solid, dark lines) and $I_{F\to D}$ (solid, light lines) as functions of $Q_D$ with fixed $Q_F$ and $h_{eff}$=200 W/$m^2$/K, L=24 in, c=4.18 kJ/kg/K, ρ=1 g/$cm^3$. Flow rates $Q_F$ are 8, 15 and 20 mL/min for a cross section of thickness w=2 mm and width d=4 in. The horizontal dashed line is I/$I_s$=1. FIG. 3C shows heat transfer enhancements (normalized to $I_s$) for $I_{F\to D}$ as functions of uuDD=uuDD for varying system lengths of 10 cm, 20 cm, 50 cm, 100 cm and 200 cm. FIG. 16D shows calculated temperature map (colors) for $Q_F$=20 mL/min and $Q_D$=2 mL/min. The black curve is the space-time trajectory of a massless probe, inserted at (0,0) until it leaves one of the channels. FIG. 16E shows same as FIG. 16D but $Q_F$=20 mL/min and $Q_D$=200 mL/min. FIG. 16F shows, same as FIGS. 16D and 16E with $Q_F$=$Q_D$=20 mL/min.

In some embodiments, a simple model may include two adjacent channels, feed (F) and distillate (D) of length L and thickness w, separated by a thin thermal conductor and flow in counter-current mode upon entering the system at a temperature $T_{a_{mb}}$ (FIG. 16A). In the embodiment shown, water in the F and D channels flows at rates $Q_F$=Aur and $Q_D$=A$u_D$ respectively, where $u_F$ and $u_D$ denote the velocities and A the cross-sectional area. The water density is ρ, and heat capacity is c. Both flows are insulated from the environment and a constant heat source $I_s$ (W/$m^2$) is placed between the channels. F and D can exchange heat $I_{F\leftrightarrows D}$ (along z) through an effective heat transfer coefficient $h_{eff}$. Phase changes in the fluid are not considered, and all parameters are assumed temperature independent. Further, it is assumed in some embodiments that heat is carried by the flows (advection), neglecting conductive heat transfer parallel to flow directions. This assumption is reasonable in the case of large Peclet ($P_e$) numbers (Pe>>1 in the present embodiment). Heat can leave the system through the F and D outlets. These assumptions allow characterizing the interaction between F and D as two coupled analytically solvable 1D systems.

FIG. 16B shows plots $I_{F\to D}$ (dark lines) and $I_{D\to FF}$ (light lines) normalized to the input heat source $I_s$, for different $u_F$ values and dimensionless parameters $$\gamma_D = \frac{h_{eff} L}{cw\rho} \frac{1}{u_D}$$

which conveniently includes all the system parameters and can be tuned simply by changing $u_D$. Curves 1604, 1606, and 1608 are for values of $\gamma_F$ of 24.7, 13.2, and 9.9 respectively. A peak in thermal exchange is reached when $\gamma_D \approx \gamma_F$ (i.ee $u_D \approx u_F$) where $I_{F\to D} \approx I_{D\to F}$. Here, heat may circulate between F and D (FIG. 16A), leading to an accumulation of thermal energy. In mathematical terms, when $u_D \to u_F$ the system becomes symmetric for 180° rotations of the xz plane and heat fluxes must be equal in magnitude and with opposite directions. The curves do not overlap at different flow velocities ($\gamma_D$>>$\gamma_F$ Or $\gamma_D$<<$\gamma_F$) due to the lack of mirror symmetry with respect to z (the flow velocities have opposite signs). It may also be understood in simple physical terms that if $\gamma_D$<<$\gamma_F$, the distillate flow is much faster than the feed flow, and the whole D channel is close to Tamb. Therefore $I_{F\to D}$ is positive and $I_{D\to F}$ is negative and when $\gamma_D$>>$\gamma_F$, heat transfers are reversed.

Figure 17:
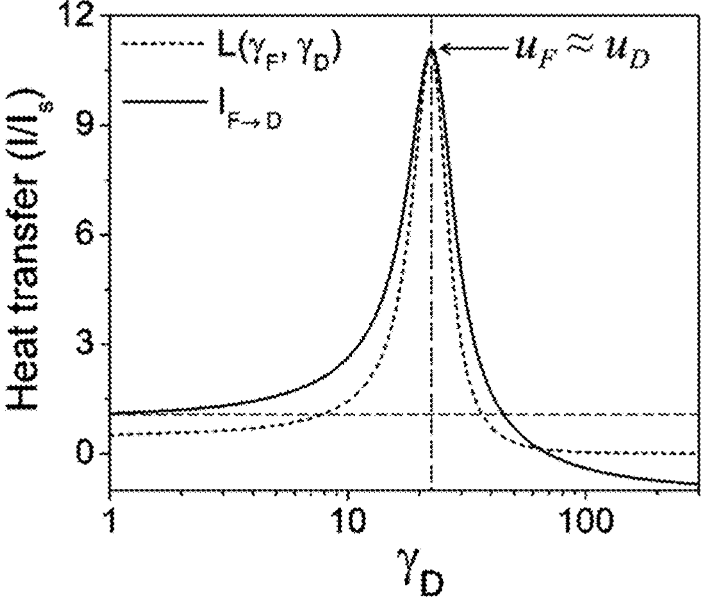
FIG. 17 shows a flow-dependent heat transfer $I_{F\leftrightarrows D}$ as a Lorentzian without fitting parameters.

It is possible to describe the flow-dependent heat transfer $I_{F\leftrightarrows D}$ as a Lorentzian curve (as shown in FIG. 17) without fitting parameters. Lorentzian responses are typical of many oscillating phenomena, reinforcing the description of the coupled system as one having a resonance. The overlap is exact at $\gamma_D$=$\gamma_F$, where:

$$I_{F\to D} \cong I_{D-F} = \frac{1}{2} I_s \gamma, \text{ with } \gamma = \gamma_D = \gamma_F (\text{i.e. } u_D = u_p)$$

This phenomenon has analogies with many other resonant oscillator systems (e.g., laser cavities, plasmonic nanoparticles, ring resonators) where an external source couples to a system (e.g., light incident on a metallic nanoparticle) which stores energy (e.g., electromagnetic energy) before releasing or dissipating the input power (e.g., scattered radiation or heat). In some embodiments, the system (one of the channels) is driven by a flow rate (the opposite, heated channel), the stored energy is thermal, and the coupled and the released powers are heat fluxes.

Figure 18A:
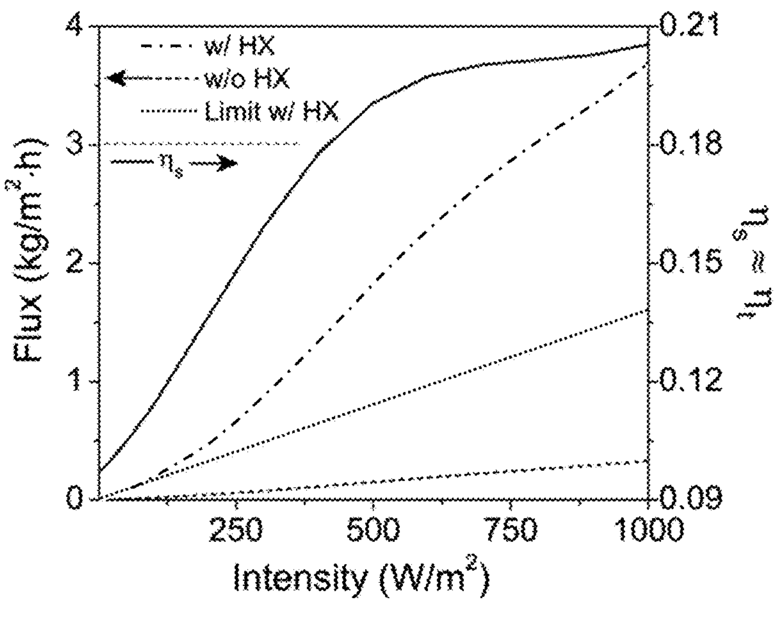
FIG. 18A shows flux rate in the case of no heat recovery, heat recovery, and theoretical limit for thermal desalination without heat recovery depending on incident irradiation for a stacked system and extracted solar utilization efficiency obtained by taking the ratio between the calculated flux rates without heat recovery and the corresponding theoretical limit.
Figure 18B:
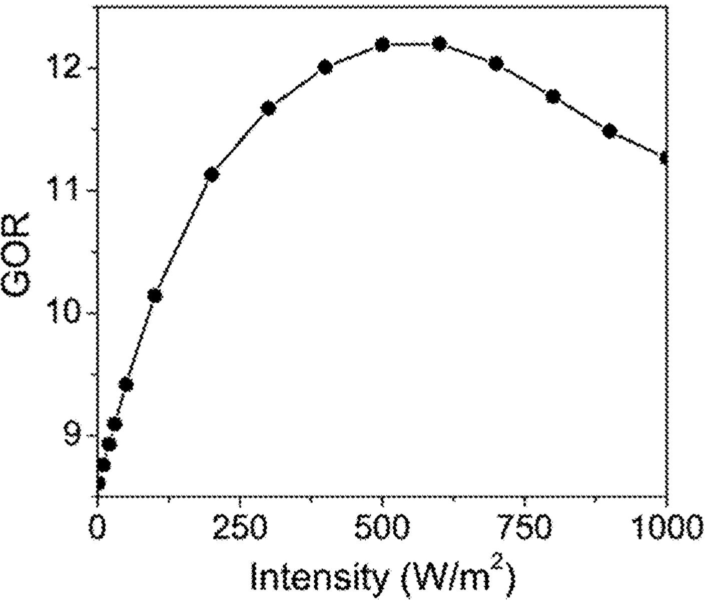
FIG. 18B shows calculated GOR by taking the ratio between flux rates with and without heat recovery and assuming the solar efficiency.

In addition to establishing the resonant condition, γ plays the role of the heat transfer 'enhancement' (I/$I_s$) between the channels. With γ∞Lu/, longer channels (larger L) will obtain stronger coupling for high-velocity flows. This general picture is relevant for the specifics of the TDO system, with $I_s$ representing heat generated by the CB nanoparticles and $I_{F\to D}$, $I_{D\to F}$ representing evaporation-condensation and recovered heat fluxes respectively. A predicted $$\frac{I_{F\to D}}{I_s} > 1$$

translates to a thermal desalination efficiency $$\eta = \frac{I_{evap}}{I_s} > 1$$

where $l_{evap}=H_{evap}F$. $H_{evap}$ (J/kg) is the water enthalpy of vaporization and FF ($kg/(m^2h)$) represents the distilled flux rate. An efficiency larger than one can be associated with the gained output ratio (GOR) which quantifies how condensation heat is reused for further distillation. Considering the obtained flux rates with and without HX, one can estimate a GOR~5 for the experimental results reported in FIGS. 2B-2D, 7, and 8 and a maximum GOR~12 for the n=10 stacked configuration (shown in FIGS. 18A and 18B). FIG. 18A shows (left y-axis) flux rates in the case of no heat recovery (dashed line), heat recovery (middle solid line) and theoretical limit for thermal desalination without heat recovery (black, bottom solid line) depending on incident irradiation for a n=10 stacked system, as analyzed in FIGS. 10E and 10F, and (right y-axis) extracted solar utilization efficiency obtained by taking the ratio between the calculated flux rates without heat recovery (dashed line) and the corresponding theoretical limit (dotted line). FIG. 18B shows, referring also to FIG. 18A, calculated GOR (top solid line) by taking the ratio between flux rates with (middle solid line) and without heat recovery (blue, dashed) assuming the solar efficiency. The dynamic control also ensures a relatively large GOR>8 for all sunlight intensities typically achieved during a day.

Figure 19:
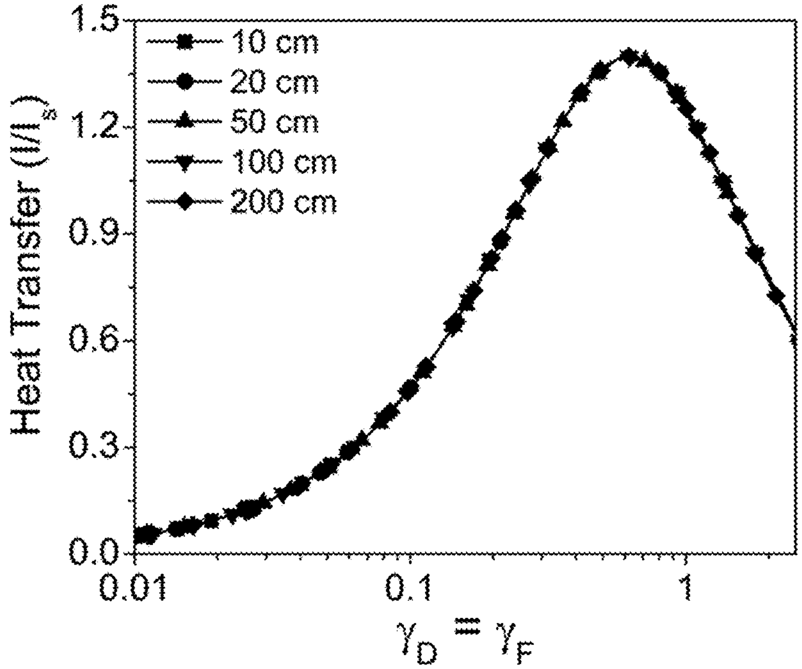
FIG. 19 shows heat transfer enhancements of net heat transfers from feed to distillate as a function of module lengths of 10 cm, 20 cm, 50 cm, 100 cm, 200 cm and fitting parameter gamma for a system.
Figure 20A:
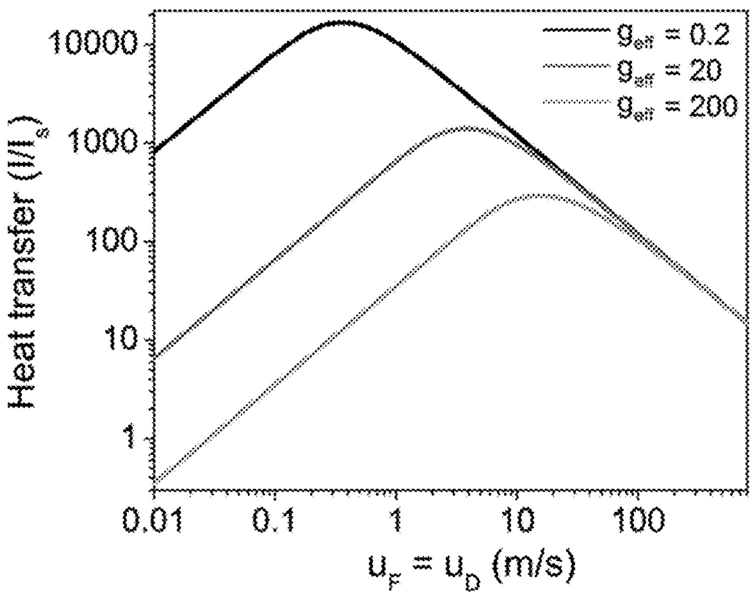
FIGS. 20A and 20B show heat transfer enhancements of net heat transfers from feed to distillate as a function of losses ($g_{eff}$ values) in the system and equal feed and distillate flows for an analytically solved 1 m system.
Figure 20B:
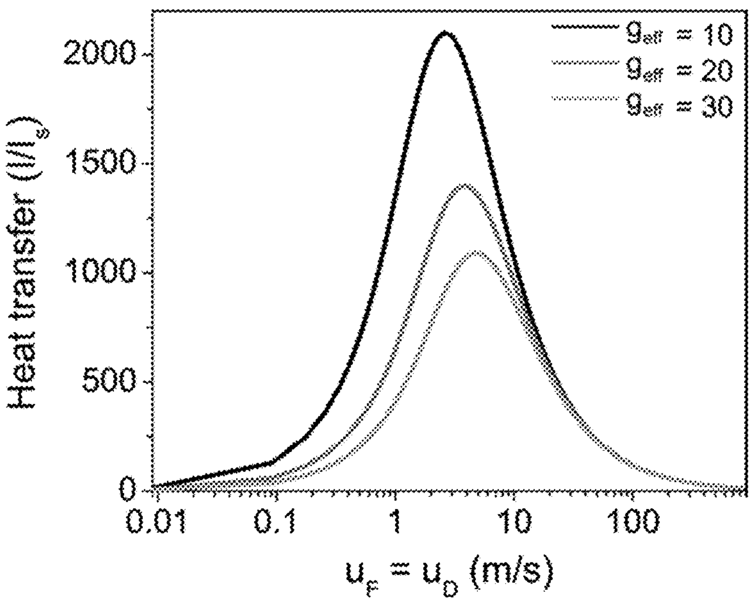

The analytical model can be extended to explain the effect of losses, expressed by the peaks shown in FIG. 10C. The model assumes now matched flows ($u_D=u_F$) and an effective loss coefficient $g_{eff}$ which transfers heat to the environment as shown in FIGS. 19 and 20A and 20B. FIG. 19 shows heat transfer enhancements (normalized to $I_s$) of net heat transfers from feed to distillate as a function of module lengths of 10 cm, 20 cm, 50 cm, 100 cm, 200 cm and fitting parameter gamma for a system. FIGS. 20A and 20B show heat transfer enhancements (normalized to $I_s$) of net heat transfers from feed to distillate as a function of losses ($g_{eff}$ values) in the system and equal feed and distillate flows for an analytically solved 1 m system. The exchanged heat flux enhancement dependence on matched flows for different module sizes is shown in FIG. 16C. Consistent with full numerical calculations (FIG. 10C), a maximum heat transfer exists for a specific value of matched flows and such value depends on the channel length (FIG. 10D).

To visualize the oscillating behavior of the coupled channels, in some embodiments 2D numerical simulations for the system in FIG. 16A where the heated flows are considered laminar and coupled with thermal transport. In FIGS. 16D-16F, the temperature maps (colors, normalized to the maximum temperature in each case) of the coupled F F and D channels are plotted far from resonance (FIG. 16D: $Q_F/Q_D=10$, FIG. 16E: $Q_F/Q_D=0.1$) and close to resonance (FIG. 16F: $Q_F/Q_D=1$). To track the heat flux dynamics, trajectories (black lines) of massless probes inserted close to the origin are shown and propagated by the heat flux field until they leave the system (black dots). Far from resonance, probes are transported to the F or D channel outlets following relatively direct paths (FIGS. 16D and 16E). At resonance, the probe circulates from F to D and vice-versa multiple times before exiting the channels (FIG. 16E). This dynamic describes the ability of the system to re-utilize heat. The cases of slower resonant flows are shown in FIG. 16G.

The basic modeling approach relates to Navier-Stokes equation solved in the channel regions for laminar flows (when the device operates in a low Reynold number regime). The diffusion equation is solved in the membrane region where both the effect of porosity and temperature are taken into account to describe the diffusion coefficient of water vapor within the membrane. The thermal transport equation is solved in all domains and include convective heat transfer within feed and distillate regions where fluids are present. Here, the differences (mainly boundary conditions) may be expanded among the geometries and thermal properties exposed in some embodiments. In the following, Inlet flow rates ($Q_F$ and $Q_D$) are considered at ambient temperature unless specified.

Figure 4:
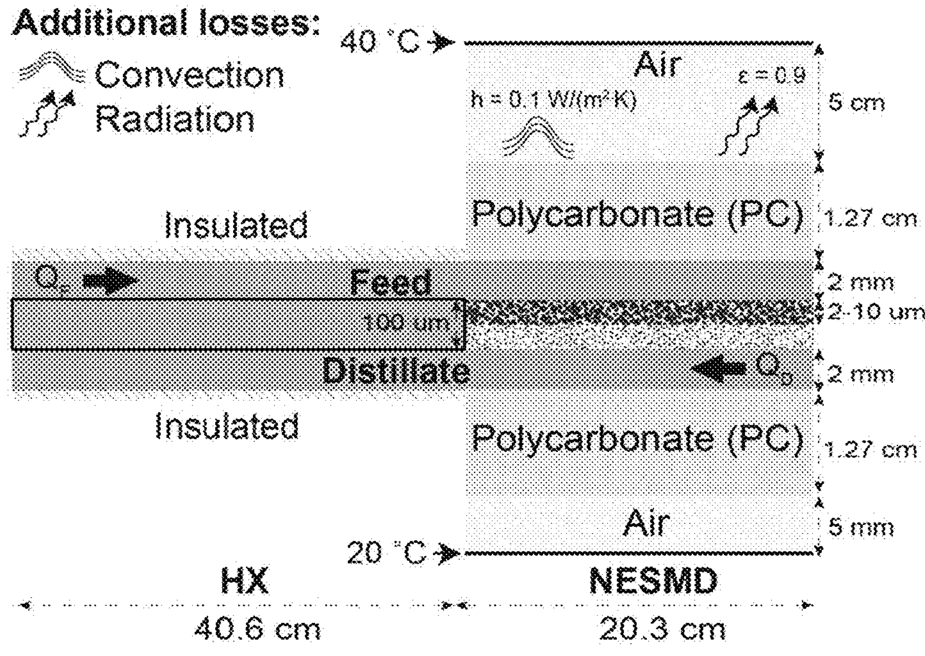
FIGS. 4-6 show schematics of different experimental conditions in NESMD modules coupled with HX modules in accordance with one or more embodiments.

A first model, Model 1 schematic shown in FIG. 4, is utilized to replicate indoor experimental conditions. Feed and distillate enter the device at a temperature of 25° C. Inflow boundary conditions have been utilized to take into account the heat flow through the inlet boundaries. The heat exchanger (100 μm boxed region of FIG. 4) is heavily insulated and, for simplicity, perfect insulation is assumed for this region. The experimental device is located on a cart made of steel which, given its high thermal conductivity can be considered as a heat sink with its temperature fixed at room temperature, 20° C., used as boundary condition. The bottom surface of the polycarbonate case is fixed to the membrane with screws, which hold the device at 5 mm from the top of the cart. The LEDs illuminate the device from a 10 cm distance but the glass of the LED lamp is placed at 5 cm from the top of the polycarbonate and it is heated by LEDs dissipation at a measured temperature of 40° C., which is used as boundary condition. Additional convective and radiative losses from the top polycarbonate surface have been included. Since LEDs are placed relatively close to the device a reduced convective contribute is expected and a convective coefficient h=0.1 ($W/m^2/K$) has been chosen. An emissivity $\epsilon$=0.9, similar to a black body, has been chosen to evaluate radiative losses. Convective and radiative losses have been neglected in the bottom region as the bottom surface of the polycarbonate layer reaches a temperature close to the heat sink fixed 20° C. boundary condition. All the lateral boundaries are considered thermally insulating since any loss can be neglected given the limited thickness of the domains compared to the lateral extension of the device.

Figure 5:
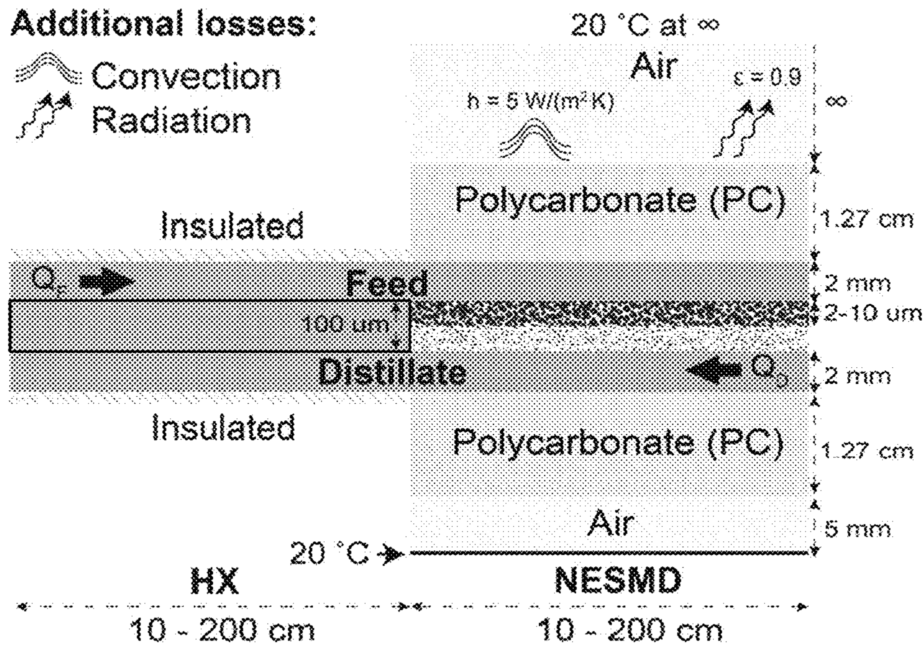

A second model, Model 2 schematic shown in FIG. 5, is utilized for FIGS. 10A-10D for calculating data. The idea behind FIGS. 10A-10D was to estimate the performance of the experimental device outdoor and for different sizes. Therefore the model is the same as in the previous section with the exception of the varying size and boundary conditions. In particular, LEDs are replaced by sunlight intensity and the top polycarbonate surface now exchanges heat with the environment: a thick layer of air is considered ending with infinite elements to mimic outdoor conditions. Convective and radiative losses are referred to 20° C. outdoor temperature and h=5 ($W/m^2/K$) is employed to simulate unforced natural convection.

Figure 6:
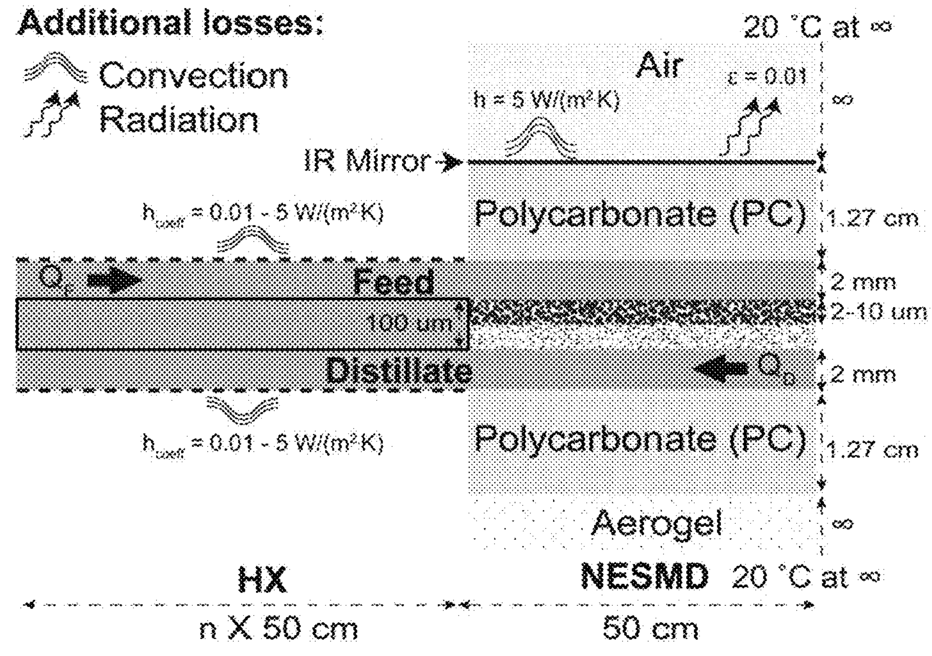

A third model, Model 3 schematic shown in FIG. 6, is utilized for FIGS. 10E-10F for calculating data. The optimized model considered in FIGS. 10E-10F, is based on the same principles of Model 1 and Model 2 with the following differences. The device is considered now placed on an aerogel base (more insulating than polycarbonate: $K_{aero}$=0.017 (W/m/K) compared to $k_{poly}$=0.19 (W/m/K). In order to minimize radiative losses, an infrared mirror is assumed to be placed on top of the polycarbonate top layer with an emissivity $\epsilon$=0.01. Finally, to investigate the impact of potential losses in the heat exchanger region, a varying heat transfer coefficient $h_{coeff}$=0.1-5 (W/m/K) has been chosen for both HX surfaces which are now assumed to dissipate heat with the environment at 20° C.

Figure 21A:
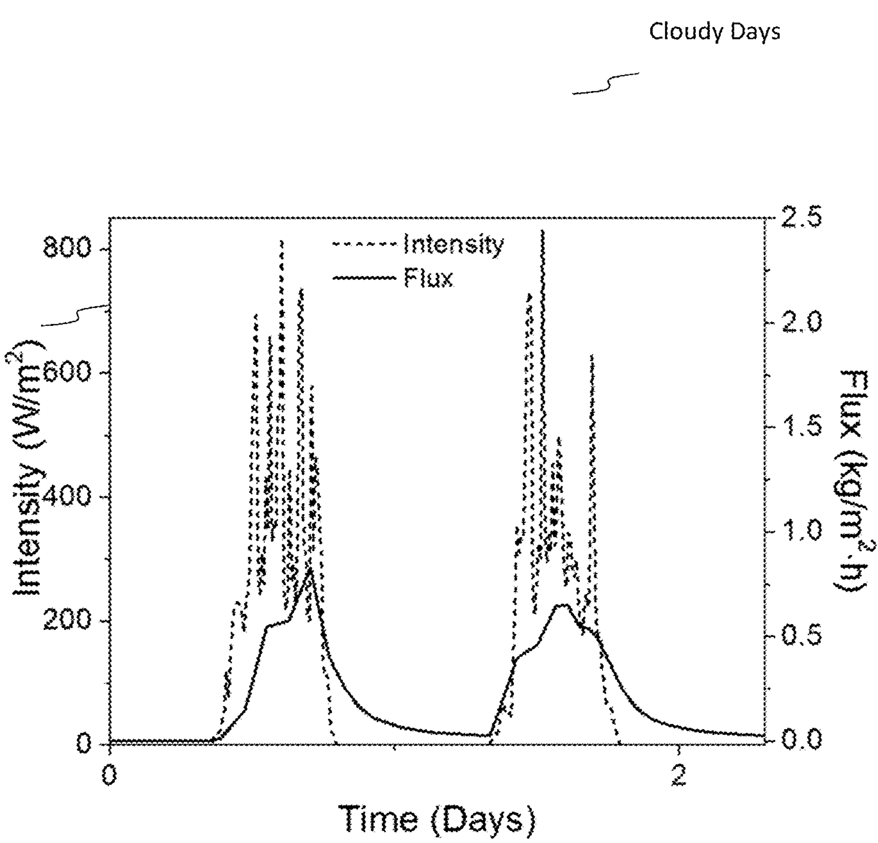
FIG. 21A shows solar desalination with resonant thermal oscillator with energy storage powers after hours processing for cloudy days.
Figure 21B:
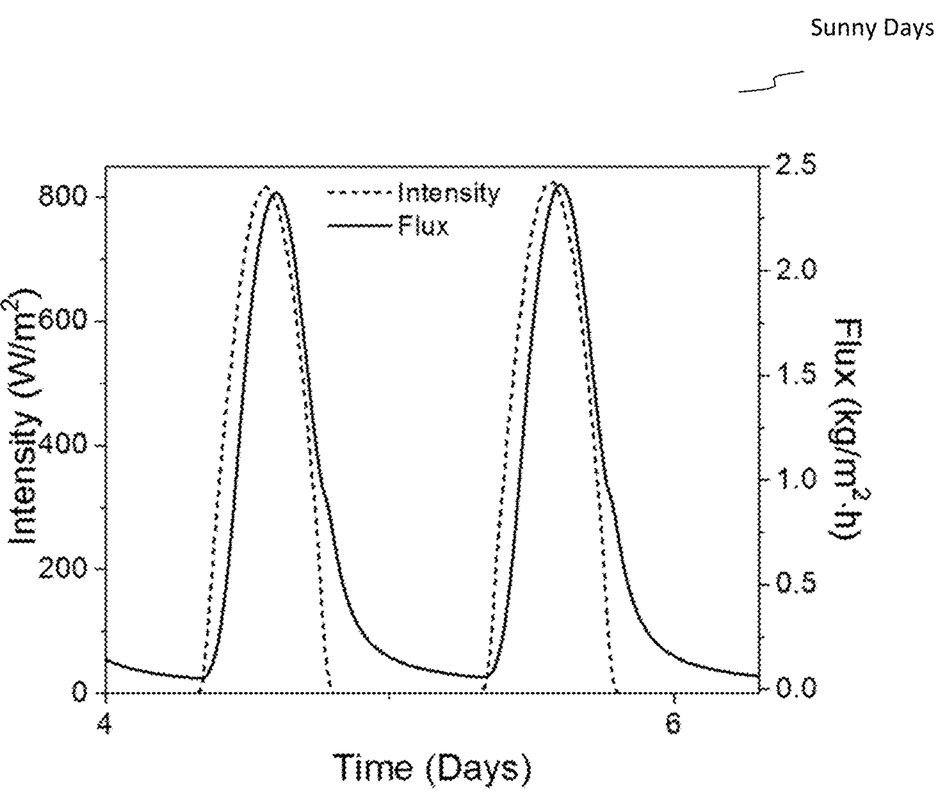

Turning to FIGS. 21A and 21B, FIGS. 21A and 21B show an example of solar desalination with resonant thermal oscillator with energy storage powers after hours processing for cloudy days and sunny days, respectively. The examples shown are simulation based on solar data obtained at Alamogordo, NM.

Turning to FIG. 22, FIG. 22 shows the effect of a reduction of thermal conductivity, $$K_{HX} = m_{COND} \times 400(W/(mK))$$

of an HX material, where $m_{COND}$ is the is the multiplication factor that compares a given conductivity with another conductivity. Given the relative low velocity of both feed and distillate fluids (<1 mm/s) in relation to the length of the HX (40.6 cm), the thermal conductivity has little effect on the heat recovery, unless it drops considerably ($m_{COND}$<0.001). The small decrease in flux observed for high thermal conductivities is likely due to the well-insulated HX region, differently from the membrane region which is exposed to the environment through illumination window. As consequence, a larger thermal conductivity implies that the heat is recycled closer to the membrane area, which may be more exposed to external losses.

Turning now to FIGS. 23A-23D, FIG. 23A shows the fresh water flux rate and maximum temperature in the system when the thickness of feed and distillate channels (w) is changed from ~0.5 mm to ~50 mm. This parameter also sizably affects the system performance, showing a peak at w~1.6 mm. In FIGS. 23B-23D, FIGS. 23B-23D show temperature and heat flux vector fields for the case of w~0.5 mm, 1.6 mm, and 50 mm, respectively. The higher maximum temperatures do not necessarily correlate with a better performance as different losses may drain more input power when temperature increases.

Turning to FIG. 24, FIG. 24 shows a flowchart 2400 describing methods for a resonant thermal oscillator in a thermofluidic system, in accordance with one or more embodiments. It is to be understood that one or more of the steps shown in the flowchart may be omitted, repeated, and/or performed in a different order than the order shown. Accordingly, the scope of the invention should not be considered limited to the specific arrangement of steps shown in the flowchart.

In Step 2402, a nanophotonics-enabled solar membrane distillation system and a dynamic heat recovery system may be combined as a coupled system where at least two counter-flowing liquid streams separated by a membrane comprising a feed stream and a distillate stream are matched. In Step 2404, a heat energy may be recycled into the feed stream by the coupled system of the nanophotonics-enabled solar membrane distillation system and the dynamic heat recovery system.

In Step 2406, an operation may be enabled by the coupled system of the nanophotonics-enabled solar membrane distillation system and the dynamic heat recovery system, when no light is incident on the coupled system.

Thermofluidic systems utilizing heat transfer mechanisms disclosed herein may be used in different applications. For example, systems disclosed herein may be used for desalination applications, such as discussed above describing NESMD and STREED systems. In some embodiments, systems disclosed herein may utilize overall temperature control in a thermal oscillator to enhance a process, e.g., with chemical reactions. For example, chemical reactions may be accelerated under increased temperatures. The use of a thermofluidic system in accordance with embodiments of the present disclosure as a thermochemical reactor may include at least two counter-flowing liquid streams where at least one stream includes a chemical precursor to chemical reaction in a resonant thermal oscillator. By accumulating thermal energy using thermal oscillators in systems disclosed herein, the temperature in the system may be increased to accelerate chemical reactions of the chemical precursor(s). Further, if a light absorbing layer that separates the fluid channels in thermofluidic systems disclosed herein is modified to include materials that catalyze chemical reactions of interest, one can exploit low cost power inputs (such as sunlight) to enhance the rate at which the reaction runs. In such manner, any liquid phase thermal reaction may be enhanced by a thermal oscillator.

In some embodiments, systems disclosed herein may be used for thermal energy accumulation, where keeping a thermal oscillator at resonance may keep the heat in the system trapped. As consequence, it takes a relatively long time for the system to return to ambient temperature, even when the light source is turned off. Thus, in contrast to conventional solar technologies that have an abrupt drop in their functionality when the illumination decreases (e.g., at night), thermal oscillators used in systems of the present disclosure can store thermal energy for a longer time and can be, at least partially, operational even if the illumination is blocked (e.g., by clouds) or stops (e.g., at night). In such manner, systems according to embodiments of the present disclosure may use thermal oscillators as a thermal battery. Thermal batteries may be used to store heat, which can be used to drive a thermal process at a later time. Further, systems used as a thermal battery may be controlled to control the charging (storing the heat) and discharging (extracting the heat) by operating the thermal oscillator at resonance or out of resonance. Since the resonance can be controlled simply by tuning input flow rates, the use of the thermal oscillator in systems disclosed herein may provide a fluid driven thermal battery. Systems according to embodiments of the present disclosure may be used as thermal batteries for various applications, such as cooling and heating in electric vehicles.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed as new and desired to be protected by Letters Patent of the United States is:

1. A system, comprising:

a thermal oscillator module comprising a thermally conductive sheet, a vapor-transmitting layer, two counter-flowing fluid streams comprising a first fluid stream and a second fluid stream, separated into a first channel and a second channel, respectively, by the thermally conductive sheet and the vapor-transmitting layer, wherein the thermal oscillator module is configured to allow the first fluid stream to be heated under exposure to a time-varying thermal energy source;

wherein either:

the system comprises a solar thermal resonant energy exchange desalination (STREED) system, wherein the thermal oscillator module comprises a combined distillation and heat exchange module, wherein the first fluid stream is a portion of a feed stream, the second fluid stream is a counterflowing portion of the feed stream, the thermally conductive sheet and the vapor-transmitting layer are stacked between the first fluid stream and the second fluid stream in the combined distillation and heat exchange module, and the vapor-transmitting layer comprises a membrane-less air gap; or the system comprises a nanophotonics-enabled solar membrane distillation (NESMD) system, wherein the thermal oscillator module comprises a distillation module coupled to a separate heat exchange module, wherein the first fluid stream is a feed stream, the second fluid stream is a distillate stream, the vapor-transmitting layer divides the feed stream and the distillate stream in the distillation module, the thermally conductive sheet divides the feed stream and the distillate stream in the heat exchange module, and the vapor-transmitting layer comprises a membrane; and a flow control device dependent on a time-varying thermal energy intensity input and positioned along the first channel, wherein the flow control device is configured to drive resonant thermal oscillations in the thermal oscillator module by using the flow control device to tune a flow rate of the first fluid steam to a resonant value of the flow rate at which a distillate output of the thermal oscillator module is substantially increased compared to a distillate output of the thermal oscillator module driven at a non-resonant value of the flow rate.

2. The system according to claim 1, wherein the system is a STREED system and further comprises:

a second thermal oscillator module fluidly connected to the first thermal oscillator module.

3. The system according to claim 1, wherein the-thermally conductive sheet comprises a metal selected from copper and aluminum.

4. A method, comprising:

providing a thermal oscillator system comprising a thermal oscillator module comprising a thermally conductive sheet, a vapor-transmitting layer, and two counter-flowing fluid streams separated into a first channel and a second channel, respectively, by the thermally conductive sheet and the vapor-transmitting layer;

wherein the two fluid streams comprise a first fluid stream and a second fluid stream;

wherein the thermal oscillator module is configured to allow the first fluid stream to be heated under exposure to a time-varying thermal energy source; and a flow control device positioned along the first channel and dependent on a time-varying thermal energy intensity input; and wherein either:

the thermal oscillator system comprises a solar thermal resonant energy exchange desalination (STREED) system, wherein the thermal oscillator module comprises a combined distillation and heat exchange module, wherein the first fluid stream is a portion of a feed stream, the second fluid stream is a counterflowing portion of the feed stream, the thermally conductive sheet and the vapor-transmitting layer are stacked between the first fluid stream and the second fluid stream in the combined distillation and heat exchange module, and the vapor-transmitting layer comprises a membrane-less air gap; or the thermal oscillator system comprises a nanophotonics-enabled solar membrane distillation (NESMD) system, wherein the thermal oscillator module comprises a distillation module coupled to a separate heat exchange module, wherein the first fluid stream is a feed stream, the second fluid stream is a distillate stream, the vapor-transmitting layer divides the feed stream and the distillate stream in the distillation module, the thermally conductive sheet divides the feed stream and the distillate stream in the heat exchange module, and the vapor-transmitting layer comprises a membrane; and driving resonant thermal oscillations in the thermal oscillator module using the flow control device to tune a flow rate of the first fluid steam to a resonant value of the flow rate at which a distillate output of the thermal oscillator module is substantially increased compared to a distillate output of the thermal oscillator module driven at a non-resonant value of the flow rate.

5. The method of claim 4, wherein the thermal oscillator system comprises the NESMD system and the method further comprises using a second flow control device to tune a second flow rate of the second fluid stream independently of the flow rate of the first fluid stream.

6. The method of claim 4, further comprising:

measuring the time-varying thermal energy intensity input; and calculating heat losses from the thermal oscillator module tuning the flow rate as a function of the time-varying thermal energy intensity input and the heat losses, where the flow rate is increased as the heat input intensity time-varying thermal energy intensity input increases and as the heat losses decrease.

7. The method of claim 4, wherein the thermally conductive sheet comprises a metal selected from copper and aluminum.

8. The method of claim 4, wherein the thermal oscillator system is a STREED system and the thermal oscillator module produces a first output of fluid when the flow rate of the first fluid stream is adjusted to provide a selected net heat transfer, wherein the method further comprises:

providing at least one additional thermal oscillator module, each additional thermal oscillator module;

wherein each of the at least one additional thermal oscillator module produces an additional output of fluid;

combining the first output of fluid and the additional output of fluid from the at least one additional thermal oscillator module to provide a total output of fluid, defining a total distillate output of the thermal oscillator system; and altering a number of the at least one additional thermal oscillator module that is combined to alter the total distillate output.

9. The method of claim 4, wherein the method comprises storing thermal energy in the thermal oscillator module on resonance.

10. The method of claim 9, wherein while the thermal energy is stored the first fluid stream is exposed to the time-varying thermal energy source.

11. The method of claim 4, wherein the method comprises extracting thermal energy from the thermal oscillator module by detuning the flow rate to equal the non-resonant value.

12. The method of claim 11, wherein while the thermal energy is extracted the time-varying thermal energy source is absent.

13. The method of claim 4, wherein the distillate output is increased at least 250%.

14. The method of claim 4, wherein when the thermal oscillator module comprises a combined distillation and heat exchange module, the vapor-transmitting layer further comprises a mesh of a thermal energy absorbing material between the membrane-less air gap and the second fluid stream; and wherein when the thermal oscillator module comprises a distillation module coupled to a separate heat exchange module the vapor-transmitting layer comprises the solar absorbing material embedded in the membrane.

15. The method of claim 14, wherein the thermal energy absorbing material comprises carbon black nanoparticles.

* * * * *